US012456522B2

(12) United States Patent
Jiang et al.

(10) Patent No.: US 12,456,522 B2
(45) Date of Patent: Oct. 28, 2025

(54) MEMORY DEVICE AND METHODS OF ERASURE OPERATION USING DIFFERENT FLOAT TIMES FOR STRING SELECTION TRANSISTORS

(71) Applicant: Yangtze Memory Technologies Co., Ltd., Hubei (CN)

(72) Inventors: SongMin Jiang, Hubei (CN); HongTao Liu, Hubei (CN); Ying Huang, Hubei (CN); Lei Guan, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 216 days.

(21) Appl. No.: 18/475,027

(22) Filed: Sep. 26, 2023

(65) Prior Publication Data
US 2025/0006274 A1      Jan. 2, 2025

(30) Foreign Application Priority Data
Jun. 29, 2023   (CN) .......................... 202310793195.9

(51) Int. Cl.
G11C 16/16    (2006.01)
G11C 5/02     (2006.01)
(Continued)

(52) U.S. Cl.
CPC .............. G11C 16/16 (2013.01); G11C 5/025 (2013.01); G11C 16/0433 (2013.01);
(Continued)

(58) Field of Classification Search
CPC ..... G11C 16/16; G11C 5/025; G11C 16/0433; G11C 16/08; G11C 19/285;
(Continued)

(56) References Cited

U.S. PATENT DOCUMENTS

2008/0089134 A1   4/2008  Ito
2016/0336075 A1   11/2016 Lee et al.
(Continued)

FOREIGN PATENT DOCUMENTS

CN    113808643 A       12/2021
CN    114863978 A    *   8/2022   ............. G11C 16/14
JP    2012094230 A       5/2012

OTHER PUBLICATIONS

China National Intellectual Property Administration, "The First Office Action," issued in connection with Chinese Patent Application No. 202310793195.9, dated Sep. 17, 2025, 27 pages. [English translation included]

Primary Examiner — Donald HB Braswell
(74) Attorney, Agent, or Firm — HANLEY, FLIGHT & ZIMMERMAN, LLC

(57) ABSTRACT

A memory, a memory system and a method of operating the memory are disclosed, belonging to the field of storage technologies. When an erase operation is performed on various strings in the block of the memory, if there are a first string that has been erased and a second string that has not been erased among the strings, the selection line coupled to the first selection transistor of the first string is floated in advance before the selection line coupled to the first selection transistor of the second string is floated, to thereby reduce the erasing speed of the first string and prevent the first string from being over-erased during the erasing of the second string, which reduces the possibility of lateral spreading of memory cells in the subsequent first string after programming, and weakens the threshold voltage drift of the memory cells in the first string.

20 Claims, 9 Drawing Sheets

(51) Int. Cl.
    *G11C 16/04*     (2006.01)
    *G11C 16/08*     (2006.01)
    *G11C 19/28*     (2006.01)
    *H10B 41/43*     (2023.01)
    *H10B 41/44*     (2023.01)
    *H10B 41/49*     (2023.01)

(52) U.S. Cl.
    CPC ............ *G11C 16/08* (2013.01); *G11C 19/285* (2013.01); *H10B 41/43* (2023.02); *H10B 41/44* (2023.02); *H10B 41/49* (2023.02)

(58) Field of Classification Search
    CPC ..... G11C 16/0483; G11C 16/14; G11C 16/24; G11C 16/34; H10B 41/43; H10B 41/44; H10B 41/49
    See application file for complete search history.

(56) References Cited

U.S. PATENT DOCUMENTS

| | | | |
|---|---|---|---|
| 2019/0221267 A1* | 7/2019 | Ko | G11C 16/0483 |
| 2021/0391017 A1* | 12/2021 | Choi | G11C 16/0483 |
| 2024/0194269 A1* | 6/2024 | Kim | G11C 16/0483 |

\* cited by examiner

MEMORY DEVICE AND METHODS OF ERASURE OPERATION USING DIFFERENT FLOAT TIMES FOR STRING SELECTION TRANSISTORS

CROSS-REFERENCE TO RELATED APPLICATION

This application claims priority to and the benefit of Chinese Patent Application 202310793195.9, filed on Jun. 29, 2023, which is hereby incorporated by reference in its entirety.

TECHNICAL FIELD

The present application relates to the field of storage technologies, and in particular, to a memory, a memory system and a method of operating the memory.

BACKGROUND

With the development of semiconductor technologies, memory is widely used in various types of electronic devices. The electronic device inevitably performs an erase operation on blocks in the memory during operation. When erasing a block, the erasing speed of various strings in the block are inconsistent due to process variation, which leads to different erase depths of various strings. The erase depth can be embodied as the magnitude of the threshold voltage of the memory cell in the erased state in the string. If the threshold voltage of this type of memory cells is low, the string will appear to have a deep erase depth. If the threshold voltage of this type of memory cells is high, the string will appear to have a shallow erase depth.

DETAILED DESCRIPTION

To make the purpose, technical solution and advantages of the present application clearer, the implementation of the present application will be further described in detail below in conjunction with the accompanying drawings.

The terms such as "first", "second" and the like in this application are used to distinguish the same or similar items with basically the same role and function. It should be understood that there is no logical or chronological dependency among the words "first", "second" and "n-th", and there is no limitation on the number and execution order. It should also be understood that although the following description uses the terms such as first, second and the like to describe various elements, these elements should not be limited by the terms.

These terms are only used to distinguish one element from another. For example, a first element could be termed a second element, and similarly, a second element could be termed a first element, without departing from the scope of the various examples. Both the first element and the second element may be elements, and in some cases, separate and distinct elements.

At least one refers to one or more than one. For example, at least one element may be one element, two elements, three elements or any integer number of elements greater than or equal to one. At least two means two or more. For example, at least two elements can be two elements, three elements or any integer number of elements greater than or equal to two.

After the memory cells in the string with a deep erase depth are programmed, lateral spreading is prone to occur, which causes the threshold voltage of the memory cells to drift.

Figure 1:
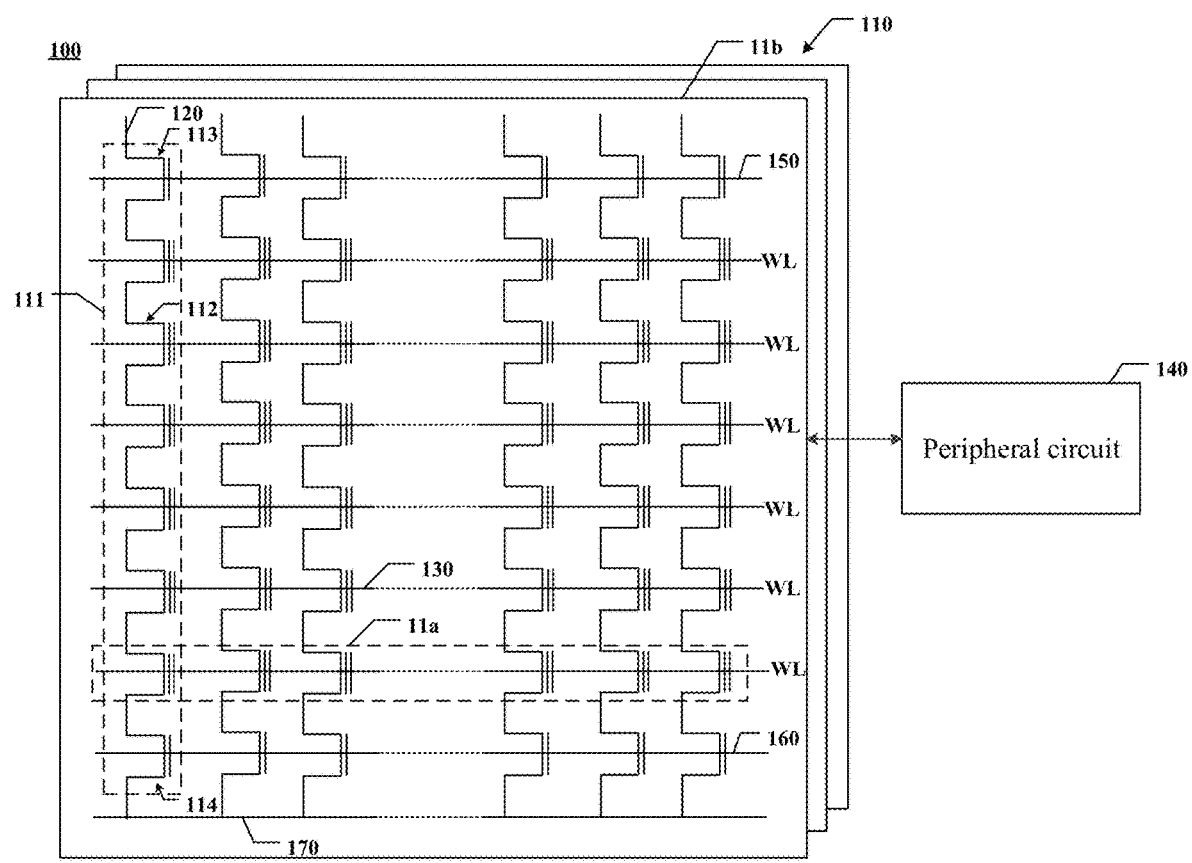
FIG. 1 is a schematic diagram of a memory according to an example implementation.

FIG. 1 is a schematic diagram of a memory according to an example implementation. As shown in FIG. 1, the memory 100 includes a memory array 110, a plurality of bit lines (BL) 120, and a plurality of word lines (WL) 130 and peripheral circuits 140.

The memory array 110 includes a plurality of substrings 111 arranged in an array above a substrate (not shown), and each substring 111 extends vertically above the substrate.

Each substring 111 includes a plurality of memory cells 112, and the plurality of memory cells 112 in each substring 111 are vertically stacked above the substrate of the memory array 110. Each memory cell 112 has the function of storing data, and the stored data is determined by the quantity of electrons stored in the memory cell 112. The size of the threshold voltage of the memory cell 112 can be determined by the quantity of electrons stored in the memory cell 112. Therefore, the threshold voltage of a memory cell 112 can be indicative of the data it stores. The memory cell 112 is a floating-gate field effect transistor or a charge trap type field effect transistor. In some implementations, the memory cell 112 may have two possible storage states. For example, the memory cell 112 may be a single-level cell (SLC) storing one bit of data. For example, the threshold voltage that a first storage state "0" of the SLC may correspond to is in a first voltage range, and the threshold voltage corresponding to the first storage state "1" of the SLC is in the second voltage range. In some other implementations, the memory cell 112 can store at least two bits of data. For example, the memory cell 112 is a multi-level cell (MLC), and the MLC can store two bits per memory cell, or three bits per memory cell (also known as triple-level cell (TLC)), or four bits per memory cell (also known as quad-level1 cell (QLC)). Each MLC can be programmed to assume a range of possible nominal storage values.

Each substring 111 further includes an upper selection transistor 113 and a lower selection transistor 114 for activating a selected substring when erasing, programming or erasing a memory cell. The upper selection transistor 113 is also called a top selection gate (TSG), and the lower selection transistor 114 is also called a bottom selection gate (BSG).

Figure 2:
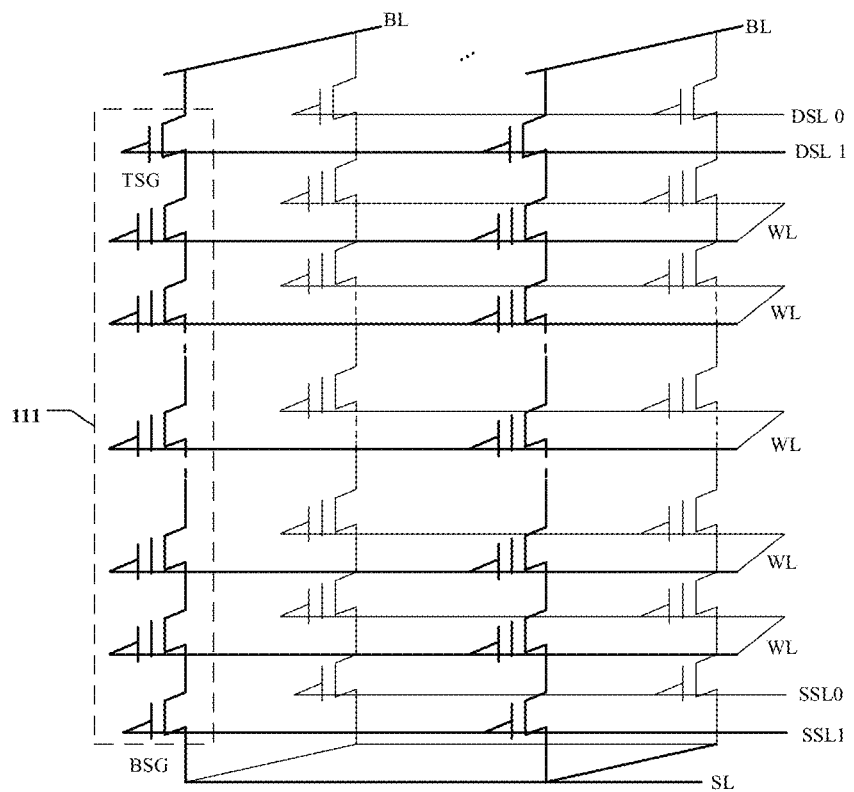
FIG. 2 is a schematic diagram of an electrical structure of a memory array according to an example implementation.

The memory 100 further includes a plurality of drain select lines (DSL) 150, each DSL 150 is coupled to the upper selection transistor 113 in at least one substring 111. As shown in FIG. 1, among the multiple substrings 111, upper selection transistors 113 with the same or similar height from a substrate bearing surface are coupled to the same DSL 150. The substrings 111 coupled to different DSLs are different. For example, the electrical structure diagram of a memory array according to an example implementation is shown in FIG. 2, where DSL0 is coupled to the TSGs of multiple substrings 111 as indicated by thin solid lines, and DSL1 is coupled to the TSGs of the multiple substrings 111 as indicated by thick solid lines. All substrings 111 coupled to the same DSL can be regarded as a string, that is, a string includes at least one substring 111. When a string includes one substring 111, this substring 111 may be called a string, and TSGs of different strings are coupled to different DSLs. When one string includes multiple substrings 111, TSGs in the multiple substrings 111 are coupled to the same DSL, and TSGs of different strings are coupled to different DSLs. Still taking DSL0 and DSL1 in FIG. 2 as an example, all substrings 111 coupled to DSL0 are organized into one string by DSL0, and all substrings 111 coupled to DSL1 are organized into another string by DSL1. At this time, the DSL coupled to the string is additionally coupled to the peripheral circuit 140, so that the peripheral circuit 140 controls the on/off state of various TSGs on the string through the DSL.

The memory 100 further includes a plurality of source select lines (SSL) 160, and each SSL 160 is coupled to the lower selection transistor 114 in at least one substring 111. As shown in FIG. 1, among the multiple substrings 111, the lower selection transistors 114 with the same or similar height from the substrate bearing surface are coupled to the same SSL 160. The substrings 111 coupled by different SSLs are different. Taking SSL0 and SSL1 in FIG. 2 as an example, SSL0 is coupled to the BSGs of multiple substrings 111 as indicated by thin solid lines, and SSL1 is coupled to the BSGs of multiple substrings 111 as indicated by thick solid lines. In some other implementations, the strings are not divided according to SSL, but are divided according to DSL. For example, all substrings 111 coupled to the same SSL are regarded as one string. That is, one string includes at least one substring 111, and BSGs of different strings are coupled to different SSLs. In the case where one string includes multiple substrings 111, BSGs in the multiple substrings 111 are coupled to the same SSL. Still taking SSL0 and SSL1 in FIG. 2 as an example, all substrings 111 coupled to SSL0 are organized into one string by SSL0, and all substrings 111 coupled to SSL1 are organized into another string by SSL1. At this time, the SSL coupled to the string is additionally coupled to the peripheral circuit 140, so that the peripheral circuit 140 can control the on/off state of various BSGs on the string through the SSL.

One end of each substring 111 is coupled to a bit line 120. As an example, one end of the substring is coupled to a bit line contact, and the bit line 120 is also coupled to the bit line contact. The other end of the substring 111 is coupled to a source line (SL) 170, for example, the other end of the substring is coupled to a substrate, and the source line 170 is also coupled to the substrate.

As shown in FIG. 2, one bit line (BL) can be coupled to multiple substrings 11. As shown in FIGS. 1 and 2, multiple substrings 111 may be coupled to the same SL 170.

As shown in FIG. 1, the memory cells 112 with the same height or similar height from the substrate bearing surface in different substrings 111 are in the same layer, and multiple memory cells 112 in the same layer form a memory cell row 11a. That is, the memory array 110 includes multiple memory cell rows, and the multiple word lines 130 are respectively coupled to the multiple memory cell rows. All the substrings 111 in the memory array 110 sharing the same group of word lines form a block 11b, and various substrings 111 in the same block 31b are all coupled to the same source line 170.

Figure 3:
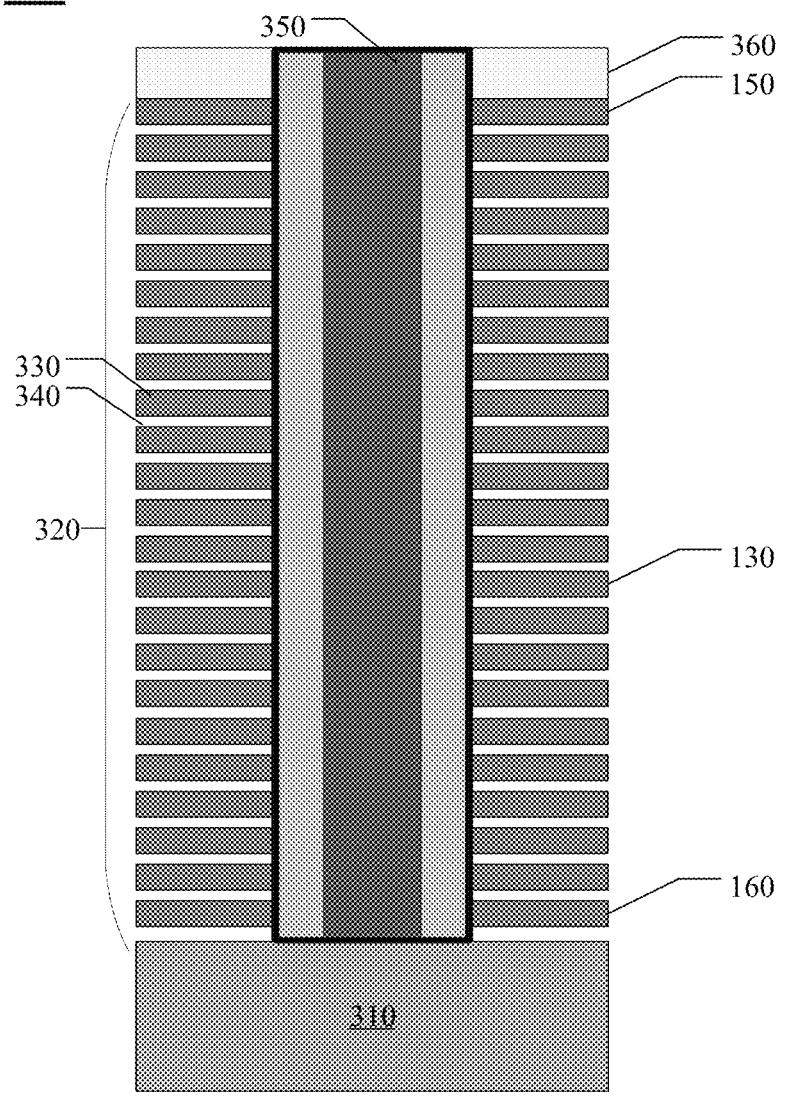
FIG. 3 is a cross-sectional side view of a substring according to an example implementation.

As the number of memory cell layers increases, multiple stacked substrings 111 need to be formed by etching multiple times. For example, FIG. 3 shows a cross-sectional side view of a substring according to an example implementation. Referring to FIG. 3, the substring 111 may vertically extend through the memory cell stack layer 320 above the doped semiconductor layer 310. The doped semiconductor layer 310 is coupled to a source line. In some implementations, the doped semiconductor layer 310 is an N-type doped semiconductor layer, and in this case the doped semiconductor layer 310 may serve as a substrate, that is, an N-type substrate. In some other implementations, the doped semiconductor layer 310 is a P-type doped semiconductor layer. At this time, the doped semiconductor layer 310 is a P well in the substrate, and at this time, the substrate is a P-type substrate.

The memory cell stack layer 320 includes alternating gate conductive layers 330 and gate-to-gate dielectric layers 340. The number of memory cells 112 in memory array 110 may be determined by the number of pairs of gate conductive layer 330 and gate-to-gate dielectric layer 340 in memory cell stack layer 320. The gate conductive layer 330 may include conductive materials including, but not limited to, tungsten (W), cobalt (Co), copper (Cu), aluminum (Al), polysilicon, doped silicon, silicide, or any combination thereof. In a possible implementation, each gate conductive layer 330 includes a metal layer, for example, a tungsten layer. In some implementations, each gate conductive layer 330 includes a doped polysilicon layer. Each gate conductive layer 330 may include a gate surrounding memory cell 112 and may extend laterally at the top of memory cell stack layer 320 as DSL 150, and at the bottom of memory cell stack layer 320 as SSL 160, or alternatively, extend horizontally between DSL and SSL as WL130.

As shown in FIG. 3, the substring 111 further includes a channel structure 350 vertically extending through the memory cell stack layer 320, and the channel structure 350 includes a channel hole filled with at least one semiconductor material (e.g., a semiconductor channel) and at least one dielectric material (e.g., memory film). In some implementations, the semiconductor channel includes silicon (e.g., a memory film). In some implementations, the memory film is a composite dielectric layer including a tunnel layer, a trap layer, and a barrier layer. The channel structure 350 may have a cylindrical shape (e.g., a pillar shape). According to some implementations, the semiconductor channel, the trap layer (also referred to as memory layer) and the barrier layer are radially arranged in this order from the center of the pillar towards the outer surface of the pillar. The tunnel layer may include silicon oxide, silicon oxynitride, or any combination thereof. The trap layer may include silicon nitride, silicon oxynitride, or any combination thereof. The barrier layer may include silicon oxide, silicon oxynitride, a high-k dielectric, or any combination thereof. In one example, the memory film may include a composite layer of silicon oxide/silicon oxynitride/silicon oxide (ONO).

As shown in FIG. 3, a doped semiconductor layer 360 is stacked on top of the memory cell stack layer 320 in the substring 111. The doped semiconductor layer 360 is also called a bit line contact. The doped semiconductor layer 360 is coupled to the bit line. The semiconductor layer 360 is an N-type doped semiconductor layer.

In the case where the doped semiconductor layer 360 is an N-type doped semiconductor layer, the substring 111 may be erased in a gate-induced drain leakage (GIDL) erasing manner by the bit line coupled with the doped semiconductor layer 360 and the DSL coupled with the TSG in the substring 111. For example, an erase voltage is applied to the bit line coupled to the doped semiconductor layer 360 so that the erase voltage acts on the doped semiconductor layer 360, and a voltage less than the erase voltage is applied to the DSL coupled to the TSG in the substring 111 so that a voltage difference is formed between the gate of the TSG and the doped semiconductor layer 360, which causes band-band tunneling to occur at the position between the gate of the TSG and the doped semiconductor layer 360, and generates GIDL. Holes in the GIDL move to the channel of the substring 111 from this position, thereby enabling injecting holes into the channel of the substring 111 from this position so that the potential of the channel increases. A voltage less than the erase voltage (called low voltage, such as 0V) is applied to the word line coupled to various memory cells in the substring 111, so as to apply the low voltage to the gate of the memory cell. As the channel potential of the memory cell increases, when the voltage difference between the gate of the memory cell and the channel of the memory cell increases, and when the voltage difference is greater than the tunneling voltage of the memory cell, the voltage difference creates a tunneling effect generated between the channel of the memory cell and the gate of the memory cell, and then the holes in the channel of the memory cell tunnel to the memory layer of the memory cell, so as to eliminate the electrons in the memory layer, thereby realizing the erasure of the memory cell.

In some implementations, when the doped semiconductor layer 310 is an N-type doped semiconductor layer, the substring block may be erased by the source line coupled to the doped semiconductor layer 310 and the SSL coupled to the BSG in the substring 111 in the GIDL erasing manner. For example, an erase voltage is applied to the source line, and a voltage less than the erase voltage (called low voltage) is applied to the SSL coupled to the BSG, so that GIDL is generated at the position between the gate of the BSG and the doped semiconductor layer 310. The holes in the GIDL move to the channel, thereby enabling injecting holes into the channel of the substring 111 from this position so that the potential of the channel increases. A low voltage is applied to the word line coupled to various memory cells in the substring 111. As the channel potential of the memory cell increases, when the voltage difference between the gate of the memory cell and the channel of the memory cell is greater than the tunneling voltage of the memory cell, holes in the channel tunnel to the memory layer of the memory cell to eliminate the electrons in the memory layer, thereby realizing the erasure of the memory cell.

Based on above, when the doped semiconductor layer 310 and the doped semiconductor layer 310 are both N-type doped semiconductor layers, the peripheral circuit can perform an erase operation on the substring 111 in the GIDL erasing manner at any end of the substring 111 (that is, single-end GIDL erasing manner). Alternatively, the substring 111 may also be erased at both ends of the substring 111 in the GIDL erasing method (that is, a double-end GIDL erasing manner).

In other implementations, when the doped semiconductor layer 310 is a P-type doped semiconductor layer, the substring 111 is erased based on the erasing manner of the P-type doped semiconductor layer. For example, an erase voltage is applied to the source line to apply the erase voltage to the P-type doped semiconductor layer, and the erase voltage causes the P-type doped semiconductor layer to generate holes. Low voltage is applied to BSG of the substring 111 and the word lines coupled to various memory cells, so that the low voltage acts on the gate of the BSG and the gates of various memory cell. Since the low voltage is less than the erase voltage, the holes move from the P-type doped semiconductor layer to the channel of the substring 111, thereby injecting holes into the channel from the P-type doped semiconductor layer. Thus, the potential of the channel increases. With the increase of the channel potential of the memory cell, when the voltage difference between the gate of the memory cell and the channel of the memory cell is greater than the tunneling voltage of the memory cell, holes in the channel tunnel to the memory layer of the memory cell to eliminate electrons in the memory layer, thereby realizing the erasure of the memory cell.

Based on above, when the doped semiconductor layer 360 is an N-type doped semiconductor layer, and the doped semiconductor layer 310 is a P-type doped semiconductor layer, double-end erasing can be performed on the substring 111. For example, single-end GIDL erasing is performed at one end of the substring 111 close to the N-type doped semiconductor layer, and erasure based on P-type doped semiconductor layer is performed at the other end of the substring 111. Alternatively, single-end erasing is performed on the substring 111. For example, single-end GIDL erasing is performed at one end of the substring 111 close to the P-type doped semiconductor layer, and erasure based on the P-type doped semiconductor layer is not performed at the other end of the substring 111. Alternatively, single-end GIDL erasing is not performed at one end of the substring 111 close to the P-type doped semiconductor layer, and erasure based on the P-type doped semiconductor layer is performed at the other end of the substring 111.

The memory cell 112 described above can be in an erased state or a programmed state, and there may be multiple programmed states. The erased state is used to represent the original state of the memory cell without programming, or the state without data stored, and can also be understood as the stored data is "0". The programmed state is used to represent the state stored with different data. For example, for the above-mentioned SLC memory cell, which can store one bit of data, only one bit of binary data "0" is needed to represent the erased state, and one bit of binary data "1" to represent the programmed state. For the memory cell of the above MLC, which can store 2 bits of data, an erased state that represents data "00" and three programmed states that represent data "01", "10" and "11" are needed.

The aforementioned erased state and programmed state are essentially reflected by the threshold voltage of the memory cell. Since the memory cell can achieve electron trapping, the tunneling effect can be used to make electrons pass through the tunneling layer to the memory layer, that is, the electron trap layer, by applying a voltage between the gate electrode and the channel, and thus the electrons are trapped in the memory layer. A change in the amount of electrons in the memory layer will result in a change in the threshold voltage of the memory cell. Therefore, if data is to be stored into the memory cell, it can be realized by injecting corresponding electrons into the memory layer. Here, the process of injecting electrons may be called "programming", that is, the state of the memory cell is adjusted from an erased state to a different programmed state through programming.

Referring back to FIG. 1, the peripheral circuit 140 is coupled to a plurality of word lines 130. The peripheral circuit 140 controls the memory cells in a selected string by controlling the voltage $V_{WL}$ of the word line 130 coupled to the selected string and the voltage $V_{BL}$ of the bit line coupled to the selected string, so as to implement the following operation methods.

Figure 4:
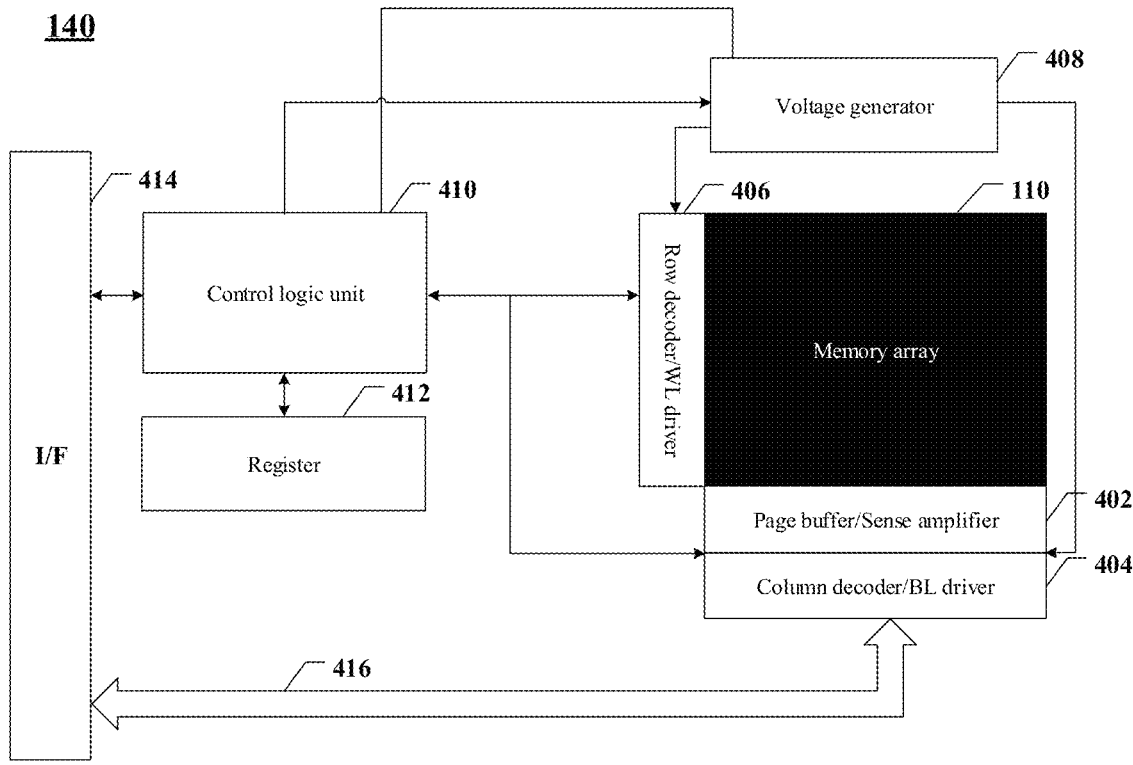
FIG. 4 is a schematic structural diagram of a peripheral circuit shown according to an example implementation.

The peripheral circuit 140 includes various types of peripheral circuits formed using metal-oxide-semiconductor (MOS) technology. For example, FIG. 4 shows a schematic structural diagram of a peripheral circuit according to an example implementation. Peripheral circuit 140 shown in FIG. 3 includes page buffer/sense amplifier 402, column decoder/bit line (BL) driver 404, row decoder/word line (WL) driver 406, voltage generator 408, control logic unit 410, register 412, interface (I/F) 414 and data bus 316. In some examples, additional peripheral circuit not shown in FIG. 3 is further included. The page buffer/sense amplifier 402 may be configured to read data from and program (write) data to the memory array 110 according to control signals from the control logic unit 410. In one example, page buffer/sense amplifier 402 may store a page of program data (write data) to be programmed into a page of memory array 110. In another example, page buffer/sense amplifier 402 may perform a program verify operation to ensure that data has been correctly programmed into memory cells 112 coupled to the selected word line. In yet another example, page buffer/sense amplifier 402 may also sense a low power signal from a bit line representing a data bit stored in memory cell 112 and amplify a small voltage swing to identifiable logic levels during read operation. Column decoder/bit line driver 404 may be configured to be controlled by control logic unit 410 and to select one or more substrings 111 by applying a bit line voltage generated from voltage generator 408.

The row decoder/word line driver 406 may be configured to be controlled by the control logic unit 410 and select/deselect the block 31b of the memory array 110 to select/deselect the word line 130 of the block 31b. Row decoder/word line driver 406 may also be configured to drive word lines by using word line voltages generated from voltage generator 408. In some implementations, the row decoder/word line driver 406 can also select/deselect and drive DSL and SSL. As described in detail below, the row decoder/word line driver 406 is configured to perform erase operations on the memory cells 112 coupled to the selected word line(s). Voltage generator 408 may be configured to be controlled by control logic unit 410 and generate word line voltages (e.g., read voltages, program voltages, pass voltages, local voltages, verify voltages, etc.), bit line voltage and source line voltage that are to be supplied to the memory array 110.

Control logic unit 410 may be coupled to each peripheral circuit 140 described above and configured to control the operation of each peripheral circuit 140. Registers 412 may be coupled to control logic unit 410 and include status registers, command registers and address registers for storing status information, command operation codes (OP codes) and command addresses for controlling the operation of each peripheral circuit 140. Interface 414 may be coupled to control logic unit 410 and act as a control buffer to buffer and relay control commands received from a host (not shown) to control logic unit 410 and to buffer and relay status information received from control logic unit 410 to the host. Interface 414 may also be coupled to column decoder/bit line driver 404 via data bus 316 and act as a data I/O interface and data buffer to buffer and relay data to memory array 110 or relay or buffer data from memory array 110.

The peripheral circuit is configured to perform an erase operation on the strings in the block in units of blocks. As the number of erasing increases, the erase depths of various strings are inconsistent. The erase depth of a string refers to the erase depth of a substring in a string. The erase depth of various substrings in the same string is consistent. The erase depth of a substring is indicated by the threshold voltage of the memory cell in the substring. For example, the lower the threshold voltage of the memory cell is, the shallower the erase depth of the substring is, the lower the threshold voltage of the memory cell is, and the higher the threshold voltage of the memory cell is, the deeper the erase depth of the substring is. After the memory cells in the substring with a deep erase depth are programmed, lateral spreading is prone to occur, which causes the threshold voltage of the memory cell to drift. The principle of lateral spreading and the principle of threshold voltage drift are introduced as follows in conjunction with the examples as shown in FIGS. 5 and 6.

Figure 5:
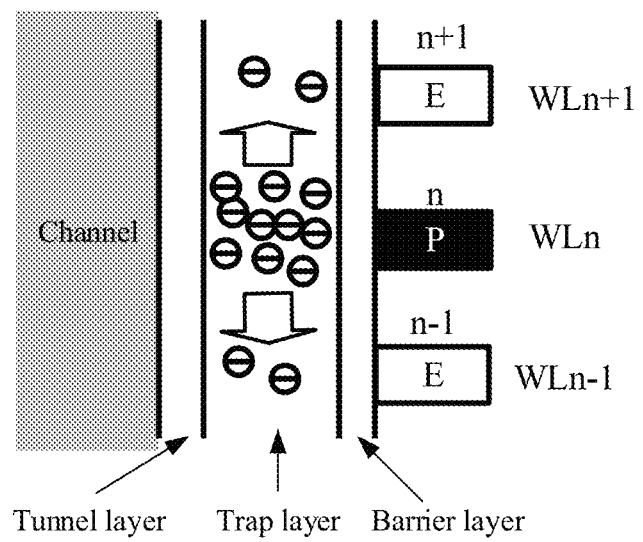
FIG. 5 is a schematic diagram showing the principle of lateral spreading according to an example implementation.
Figure 6:
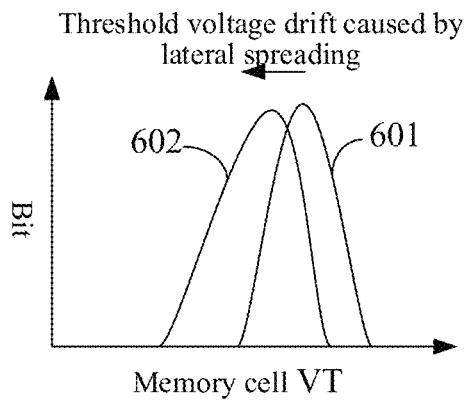
FIG. 6 is a schematic diagram showing threshold voltage drift caused by lateral spreading according to an example implementation.

FIG. 5 is a schematic diagram of the principle of lateral spreading according to an example implementation. Assuming that FIG. 5 shows a substring with a deep erase depth, it shows some memory cells on the substring: memory cell n−1 to memory cell n+1, and these three memory cells are respectively coupled to word line WLn−1 to word line WLn+1. Each memory cell includes a channel, a tunnel layer, a trap layer and a barrier layer. As shown in FIG. 5, after the substring has been erased and then programmed with full block random programming, assuming that memory cell n is in the programmed state P, the two memory cells adjacent to memory cell n (memory cells n+1 and n−1) are both in erased state E. Since memory cells n+1 and n−1 are in the erased state E, the trap layer of memory cell n−1 and the trap layer of memory cell n+1 both store a small amount of electrons or no electrons, and the threshold voltages of memory cells n−1 and n+1 are relatively low. Since memory cell n is in programmed state P, the higher the programmed state P is, the threshold voltage of memory cell n is higher, resulting in the greater difference in a threshold voltage between memory cell n and memory cell n−1, which triggers the electrons in the trap layer of memory cell n to move to the trap layer of memory cell n−1 and the trap layer of memory cell n+1. That is, lateral spreading occurs.

The electrons in the trap layer of the memory cell n move to both sides, so that the number of electrons in the trap layer decreases, resulting in a decrease in the threshold voltage of the memory cell n, that is, a drift in the threshold voltage of the memory cell n. FIG. 6 shows a schematic diagram of a threshold voltage shift caused by lateral spreading according to an example implementation. Assuming that the threshold voltage VT when the memory cell n is in the programmed state P is as shown in curve 601, the electrons in the trap layer of the memory cell n undergo lateral spreading, which causing the curve 601 of the threshold voltage VT drifting to the left, obtaining the curve 602.

However, the threshold voltage of the memory cells in the erased state on the substring with a deep erase depth is less than that of the memory cells in the erased state on the substring with a shallow erase depth. In particular, in the case of the substring with deeper erase depth, once memory cells adjacent to the memory cells in the programmed state are in the erased state after programming, the phenomenon that electrons stored in the memory cells in the programmed state spreading to adjacent memory cells becomes more serious due to the lower threshold voltage of the adjacent memory cells, which in turn causes the threshold voltage drift of the memory cells in the programmed state to become more serious. In the case of serious threshold voltage drift, the data stored in the memory cells may change, resulting in the degraded data retention characteristics of memory cells.

Figure 7:
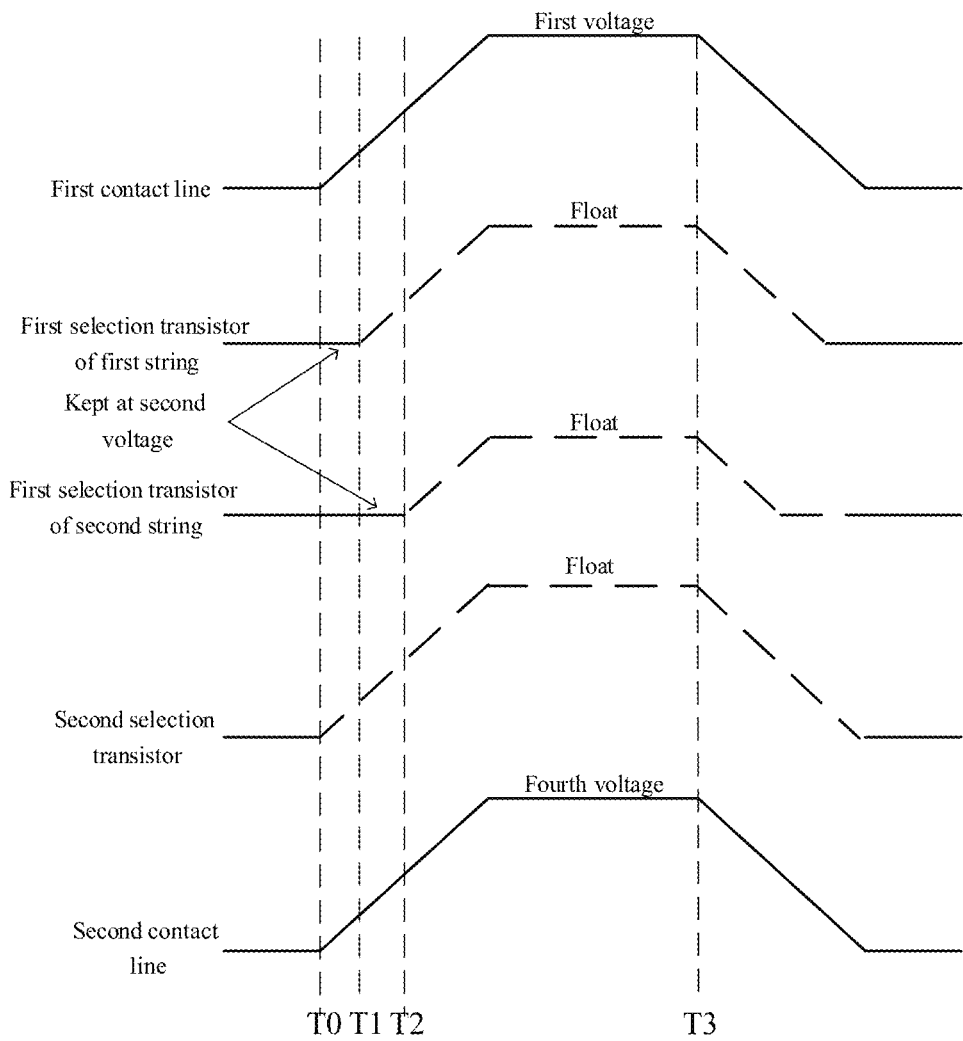
FIG. 7 is a flowchart showing a method of operating a memory according to an example implementation.

Based on this, the present application provides a method of operating a memory, avoiding strings in a block from being over-erased and avoiding occurrence of strings with a deep erase depth. For example, FIG. 7 shows a flow chart of a method of operating a memory according to an example implementation, where the memory includes a memory array and a peripheral circuit. Taking the memory as the above-mentioned memory 100 as an example, the memory array is a memory array 110. There is at least one block in the memory array, each block includes a plurality of strings, each string includes at least one substring, and the first selection transistors of various substrings in the same string are coupled to the same first selection line. The first selection transistor may be a BSG or TSG of a substring. For example, if various TSGs of the same string is coupled to the same DSL, and various BSGs of the same string is not coupled to the same SSL, the first selection transistor is a TSG. If various TSGs of the same string are coupled to the same DSL, and the BSGs of the same string are not coupled to the same SSL, the first selection transistor may be either a TSG or a BSG.

For ease of description, the selection line coupled to the first selection transistor of the substring is called a first selection line, the doped semiconductor layer close to the first selection transistor among the doped semiconductor layers coupled to both ends of the substring is called a first doped semiconductor layer, and the contact line (such as BL or SL) coupled to the first doped semiconductor layer is called the first contact line. For example, if the first selection transistor is BSG, the first doped semiconductor layer is a P well in the substrate or an N-type substrate, and the first contact line is SL. If the first selection transistor is TSG, the first doped semiconductor layer is an N-type doped semiconductor layer, and the first contact line is BL.

For ease of description, the selection transistor at the other end of the substring is called a second selection transistor, the doped semiconductor layer close to the second selection transistor among the doped semiconductor layers coupled at both ends of the substring is called a second doped semiconductor layer, and the contact line (such as BL or SL) coupled to the second doped semiconductor layer is called the second contact line. For example, if the first selection transistor is TSG, the second selection transistor is BSG, the second doped semiconductor layer is a P well in the substrate or an N-type substrate, and the second contact line is SL. If the first selection transistor is BSG, the second selection transistor is TSG, the second doped semiconductor layer is an N-type doped semiconductor layer, and the second contact line is BL.

The peripheral circuit is configured to perform the method of operating the memory, and the method of operating the memory includes performing an erase operation on a plurality of strings in the block. The block is any block whose data is to be erased in the memory array, there is at least one string that has not been erased in the block, and the at least one string is a part of the strings in the block or all strings in the block. To distinguish the strings that have been erased and the strings that have not been erased in the block, the strings that have been erased in the block are called the first string, and the strings that have not been erased in the block are called the second string. It should be understood that the first string and the second string are different strings in the block, the first selection transistor in the first string is different from the first selection transistor in the second string, the first selection line coupled to the first selection transistor of the first string is different from the first selection line coupled to the first selection transistor of the second string, the second selection transistor in the first string is different from the second selection transistor of the second string, and the first selection line coupled to the second selection transistor of the first string is different from the first selection line coupled to the second selection transistor of the second string.

As an example, if all the strings in the block are the second strings, the erase operation is described as follows.

The first voltage is applied to the first contact line coupled to the first doped semiconductor layer coupled to each string in the block from the third moment, until the seventh moment when the application of the first voltage ends, so that the first voltage acts on the first doped semiconductor layer coupled to each string from the third moment to the seventh moment. The second voltage is continuously applied to the first selection line coupled to the first selection transistor of various strings in the block from the third moment to the second moment, so that the voltage of the gate of the first selection transistor of various strings (i.e., gate voltage) is kept at the second voltage from the third moment to the second moment. The first selection line coupled to the first selection transistor of various strings is floated from the second moment to the seventh moment, so that the gate of the first selection transistor of various strings is in a floating state. The third voltage is continuously applied to the word line coupled to various memory cells of various strings in the block from the third moment to the seventh moment.

The third moment is the start moment of the erase operation on a plurality of strings in the block, the seventh moment is the end moment of the erase operation, the second moment is any timing between the third moment and the seventh moment, and the second moment is the time when the first selection transistor is floated during the erasing process of the block in the case in which all strings in the block have not been erased. The value of the second moment may be the same or different in different application scenarios. Here, the implementation of the present application does not limit the second moment. The first voltage can also be referred to as erase voltage or erase pulse. The first voltage is greater than the second voltage, and the second voltage is used to turn on the string. The second voltage is greater than or equal to 0V and less than the threshold voltage of the first selection transistor. The first voltage is greater than the third voltage, the voltage difference between the first voltage and the third voltage is greater than the tunneling voltage of the memory cell, and the third voltage is greater than or equal to 0V. Here, in the implementation of the present application, the range of values of the first voltage, the second voltage and the third voltage are not limited.

For the above erase operation, if the first doped semiconductor layer is a P-type doped semiconductor layer, the first voltage enables the P-type doped semiconductor layer to continuously generate holes from the third moment to the seventh moment. From the third moment to the second moment, since the gate voltage (that is, the second voltage) of the first selection transistor and the gate voltage (that is, the third voltage) of various memory cells in the string are both less than the first voltage, the holes move toward the channel of the string where the first selection transistor is located (that is, the channel of various substrings in the string) to raise the potential of the channel. The gates of each first selection transistor are all in a floating state from the second moment to the seventh moment, so that the gate of the first selection transistor is coupled to the first doped semiconductor layer coupled to the substring where the first selection transistor is located to form a capacitor. The principle of voltage jump across the capacitor makes the gate voltage of the first selection transistor change with the changing first voltage on the first doped semiconductor layer, so that the voltage difference between the gate of the first selection transistor and the first doped semiconductor layer is reduced, the reduced voltage difference reduces the hole transported to the channel of the string, and the speed of the increase of the channel potential is reduced.

For the above erase operation, if the first doped semiconductor layer is an N-type doped semiconductor layer, since the gate voltage (i.e., the second voltage) of the first selection transistor is less than the first voltage on the first doped semiconductor layer from the third moment to the second moment, the position between the gate of the first selection transistor and the first doped semiconductor layer generates GIDL and the holes in the GIDL move to the channel of the string to raise the potential of the channel. The gate of the first selection transistor is in a floating state from the third moment to the second moment, so that the voltage difference between the gate of the first selection transistor and the first doped semiconductor layer decreases, the decrease in the pressure difference reduces the number of holes of the GIDL, and thus the number of holes transported to the channel of the string is reduced, thereby reducing the speed of the increase of the channel potential.

For the above erase operation, from the third moment to the seventh moment, the channel potential of the string increases, and when the difference in the voltage (that is, the voltage difference) between the channel and the gate of any memory cell of the string is greater than the tunneling voltage of the memory cell, the data stored in the memory cell can be erased. From the second moment to the seventh moment, the number of holes transported to the channel of the string decreases, and the speed of electron elimination in the memory layer of the memory cell decreases, thereby avoiding strings that have not been erased are from being over-erased during performing of this erase operation.

In the case where there are first strings and second strings in the block, if the first selection transistors of various strings are floated at the second moment according to the above-mentioned erase operation, the electrons in the memory layer of the memory cell of the first string that have been erased after the second moment will continue to be eliminated, which increases the erasure depth of the first string and over-erasure of the first string is likely. In particular, after the block is erased multiple times, the electrons in the memory layers of the memory cells of the first string will continue to be eliminated after the erasing of the first string is completed as the number of subsequent erase operations increases, thereby further increasing the possibility that the first string is over-erased.

Based on this, in the case where there are the first string and the second string in the block, the first selection transistor of the first string is floated in advance before floating the first selection transistor of the second string during erasing of the block. Afterwards, the second string is then normally floated. For the convenience of description, the time at which the first selection transistor of the first string is floated is called the first moment, where the first moment is any time between the third moment and the second moment. That is, the third moment is before the first moment, and the second moment is after the first moment. The first moment can be obtained according to specific product tests. Here, the implementations of the present application do not limit the first moment.

As an example, in the case where there are first strings and second strings in the block, the erase operation on the multiple strings in the block includes: at the third moment before the first moment, applying a first voltage to the first doped semiconductor layer coupled to each string in the block; from the third moment to the first moment, applying a second voltage to the first selection line coupled to the first selection transistor of the first string; from the third moment to the second moment, applying a second voltage to the first selection line coupled to the first selection transistor of the second string; and at the third moment, applying the third voltage the word line coupled to various memory cells of each string in the block.

For example, FIG. 7 shows a voltage waveform diagram of a block during single-end erasing according to an example implementation. Assume that T0 is the third moment, T1 is the first moment, T2 is the second moment, and T3 is the seventh moment. Starting from the third moment T0, the first voltage is applied to the first contact line coupled to the first doped semiconductor layer coupled to various strings in the block until the seventh moment T3 when the application of the first voltage ends, so that the first voltage acts on the first doped semiconductor layer coupled to various strings from the third moment to the seventh moment. From the third moment T0 to the seventh moment T3, a third voltage (not shown in FIG. 7) is applied to the word lines coupled to the memory cells of the various strings.

From the third moment T0 to the first moment T1, the second voltage is applied to the first selection line coupled to the first selection transistor of the first string in the block, so that the gate of the first selection transistor of the first string is kept at the second voltage from the third moment T0 to the first moment T1. Under the action of the first voltage and the second voltage, the holes generated by the first doped semiconductor layer coupled to the first string or the holes generated at the position between the first doped semiconductor layer and the first selection transistor move to the channel of the first string (i.e., the channel of various substrings of the first string), so as to raise the potential of the channel. From the third moment T0 to the first moment T3, the third voltage (not shown in FIG. 7) is applied to the word line coupled to the memory cells of the first string, so that the voltage of the gates (that is, the gate voltage) of the memory cells of the first string the electrode is kept at the third voltage. During this period, with the increase of the channel potential of the first string, when the voltage difference between the channel and the gate of any memory cell of the first string is greater than the tunneling voltage of the memory cell, electrons in the memory layer of the memory cell of the first string are eliminated.

From the third moment T0 to the second moment T2, the second voltage is applied to the first selection line coupled to the first selection transistor of the second string in the block, so that the gate of the first selection transistor of the second string is kept at the second voltage from the third moment T0 to the second moment T2. Under the action of the first voltage and the second voltage, the holes generated by the first doped semiconductor layer coupled to the second string or the holes generated at the position between the first doped semiconductor layer and the first selection transistor move to the channel of the second string (that is, the channel of various substrings of the second string), so as to raise the potential of the channel. From the third moment T0 to the second moment T2, a third voltage (not shown in FIG. 7) is applied to the word line coupled to the memory cells of the second string, so that the gate voltage of the gates of the memory cells of the second string is kept at the third voltage. During this period, as the channel potential of the second string increases, when the voltage difference between the channel and the gate of any memory cell of the second string is greater than the tunneling voltage of the memory cell, the electrons in the memory layer of the memory cells of the second string are eliminated.

Figure 8:
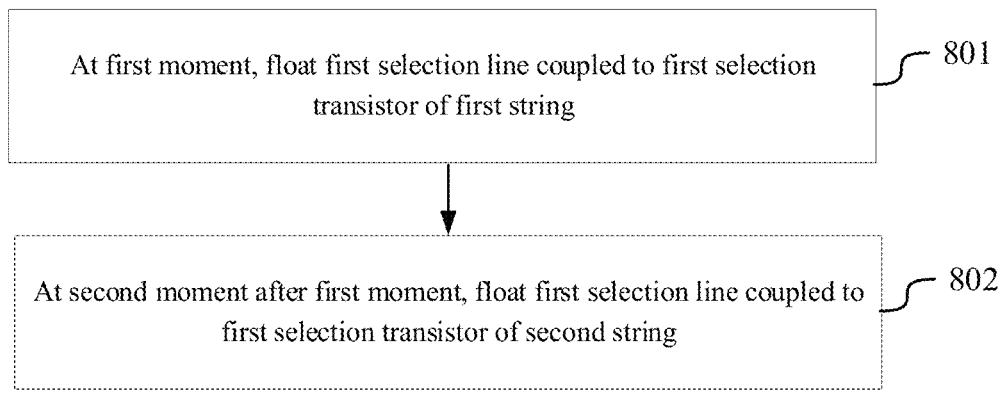
FIG. 8 is a voltage waveform diagram of a block during single-end erasing according to an example implementation.

In the case where there are first strings and second strings in the block, the erase operation on multiple strings in the block further includes operations 801 and 802 shown in FIG. 8. It should be understood that, the operation numbers are used to distinguish different operations, the operation numbers do not represent the actual sequence of operations, and the operation numbers can be changed.

801. At a first moment, floating a first selection line coupled to a first selection transistor of a first string, the first string being a string that has been erased among multiple strings of a block.

Still taking FIG. 7 as an example, starting from the third moment T0, the first moment T1 is reached after a first time period. Starting from the first moment T1, the first selection line coupled to the gate of the first selection transistor of the first string is floated until the seventh moment T3 when the floating ends. During this period, the gate of the first selection transistor of the first string is in a floating state, so that the gate of the first selection transistor of the first string is coupled to the corresponding first doped semiconductor layer (that is, the first doped semiconductor layer coupled to the substring where the first selection transistor is located) to form a capacitor, and the principle of voltage jump across the capacitor makes the gate voltage of the first selection transistor of the first string changes with the change of the first voltage. Thus, the voltage difference between the gate of the first selection transistor of the first string and the corresponding first doped semiconductive layer is reduced, resulting in the number of the holes transported to the channel of the first string decreases. As a result, the speed of eliminating the electrons in the memory layer of the memory cells of the first string from the first moment T1 to the seventh moment T3 is reduced, thereby preventing the first string from being over-erased, and reducing increase in the erase depth of the first string during this erase operation.

It should be understood that since different memory cells in the block may be in different programmed states, the higher the programmed state, the higher the threshold voltage of the memory cell is. The erasure operations need to be performed for multiple times on the block to complete erasure of various strings in the block. By setting the first moment and the second moment reasonably, this application can improve the over-erasing caused by the continued erasure of the erased string in the subsequent erasing process, so that after various strings in the block are erased, the erase depths of various strings are approximately consistent and the memory cells in various strings are not over-erased. The threshold voltage of various memory cells in the erased state in the block will not be greatly shifted to the left, that is, the threshold voltage will not be greatly reduced. Even after subsequent programming, two memory cells adjacent to the memory cell in the programmed state are in the erased state. Since the threshold voltage of the memory cell in the erased state is not greatly reduced, the threshold voltage difference between the memory cell in the programmed state and the memory cell in the erased state will not be so large, and thus the amount of the electrons in the memory cell in the programmed state that move to the memory cells in the erased state will be reduced. Therefore, the lateral spreading is weakened, the threshold voltage drift of the memory cell in the programmed state is reduced, and correspondingly the data retention characteristics of the memory cell is improved.

802. At the second moment after the first moment, floating the first selection line coupled to the first selection transistor of the second string, the second string being a string that has not been erased among the multiple strings in the block.

Still taking FIG. 7 as an example, starting from the first moment T1, the second moment T2 is reached after a second time period. Starting from the second moment T2, the first selection line coupled to the first selection transistor of the second string is floated until the seventh moment T3 when the floating ends. During this period, the gate of the first selection transistor of the second string is in a floating state, so that the gate of the first selection transistor of the second string is coupled to the corresponding first doped semiconductor layer (that is, the first doped semiconductor layer coupled to the substring where the first selection transistor is located) to form a capacitor, and the principle of voltage jump across the capacitor makes the gate voltage of the first selection transistor of the second string change with the change of the first voltage. Thus, the voltage difference between the gate of the first selection transistor of the second string and the corresponding first doped semiconductor layer is reduced, resulting in the reduction of holes transported to the channel of the second string, so that the speed of eliminating the electrons in the memory layer of the memory cells of the second string from the second moment T2 to the seventh moment T3 is reduced, thereby preventing the second string from being over-erased.

The erase operation performed on the multiple strings of the block further includes: at the third moment, applying a fourth voltage to the second doped semiconductor layer coupled to each string in the block, and at the third moment, floating the second selection line coupled to the second selection transistor of each string in the block, so as to prevent holes from being injected into the channel from the second selection transistor of the string, where the fourth voltage is greater than 0V, and the fourth voltage may or may not be the same as the first voltage.

Still taking FIG. 7 as an example, starting from the third moment T0, the fourth voltage is applied to the second contact line coupled to the second doped semiconductor layer coupled to each string in the block until the seventh moment T3 when the application of the fourth voltage ends so that the fourth voltage acts on the second doped semiconductor layer. At the third moment T0, the second selection line coupled to the second selection transistor of each string in the block is floated until the seventh moment T3 when the floating ends. During this period, the gate of the second selection transistor is in the floating state, so that the gate of the second selection transistor is coupled to the corresponding second doped semiconductor layer (that is, the second doped semiconductor layer coupled to the sub-string where the second selection transistor is located) to form a capacitor, and the principle of voltage jump across the capacitor makes the gate voltage of the second selection transistor change with the change of the fourth voltage, so as to keep the voltage difference between the gate of the second selection transistor and the second doped semiconductor layer substantially unchanged. The voltage difference is greater than 0V. When the second doped semiconductor layer is an N-type doped semiconductor layer, the voltage difference is not enough to generate GIDL or the GIDL generated by the voltage difference is relatively small, and the holes in the GIDL are not enough to erase the data in the memory cell. In the case where the second doped semiconductor layer is a P-type doped semiconductor layer, the pressure difference is relatively small and is not enough to cause a large amount of holes in the second doped semiconductor layer to enter the channel, so that it is not enough to erase the memory cells. In this way, holes are injected from one end of the string in the block to the channel to erase the data stored in the memory cells of the string, realizing single-end erasing.

In accordance with the method provided by the implementations of the present application, when an erase operation is performed on multiple strings in the block, if there are a first string that has been erased and a second string that has not been erased among the strings, the selection line coupled to the first selection transistor of the first string is floated in advance before the selection line coupled to the first selection transistor of the second string is floated, to thereby reduce the erasing speed of the first string and prevent the first string from being over-erased during the erasing of the second string, which reduces the possibility of lateral spreading of memory cells in the subsequent first string after programming, and weakens the threshold voltage drift of the memory cells in the first string.

In accordance with the method provided by the implementations of the present application, when an erase operation is performed on multiple strings in the block, if there are a first string that has been erased and a second string that has not been erased among the strings, the selection line coupled to the first selection transistor of the first string is floated in advance before the selection line coupled to the first selection transistor of the second string is floated, to thereby reduce the erasing speed of the first string and prevent the first string from being over-erased during the erasing of the second string, which reduces the possibility of lateral spreading of memory cells in the subsequent first string after programming, and weakens the threshold voltage drift of the memory cells in the first string.

In some other implementations, if the first doped semiconductor layer coupled to various strings of the block is coupled to BL, the first doped semiconductor layer is an N-type doped semiconductor layer, the second doped semiconductor layer coupled to various strings of the block is coupled to the SL, and the second doped semiconductor layer is an N-type doped semiconductor layer or a P-type doped semiconductor layer, then double-end erasing can be performed on the strings in the block. Alternatively, if the first doped semiconductor layer coupled to various strings of the block is coupled to SL, the first doped semiconductor layer is an N-type doped semiconductor layer or a P-type doped semiconductor layer, the second doped semiconductor layer coupled to various strings of the block is coupled to the BL, and the second doped semiconductor layer is an N-type doped semiconductor layer, then double-end erasing can also be performed on the strings in the block.

In some implementations, in the case of double-end erase, selection lines coupled to the first selection transistor or the second selection transistor of the first string is floated in advance during the erase operation on a plurality of strings of the block, and then this scheme of floating in advance is introduced as follows.

The process of floating the first selection transistor of the first string in advance is of the same principle as the process of floating the second selection transistor of the first string in advance. Here, introduction will be made by taking the first selection transistor of the first string being floated in advance as an example, for the following introduction, and the process of floating the second selection transistor of the first string in advance may make reference to the process of floating the first selection transistor of the first string in advance.

As an example, the erase operation performed on the multiple strings of the block includes: at the third moment, applying a fifth voltage to the second doped semiconductor layer coupled to each string in the block; at the first moment, floating the first selection line coupled to the first selection transistor of the first string (as in operation 801 above); at the second moment after the first moment, floating the first selection line coupled to the first selection transistor of the second string (as in operation 802 above); from the third moment to the second moment, applying a sixth voltage to the second selection line coupled to the second selection transistor of each string in the block; and at the second moment, floating the second selection line coupled to the second selection transistor of each string in the block. Since the first moment is before the second moment, the first selection transistor of the first string is floated in advance.

The fifth voltage is greater than 0, the fifth voltage may be the same as or different from the first voltage, and the sixth voltage is less than the fifth voltage. For example, the sixth voltage is greater than or equal to 0 and less than the fifth voltage, the sixth voltage may be the same as or different from the second voltage. Here, the implementations of the present application does not limit the range of values of the fifth voltage and the sixth voltage.

For any string in the block, a sixth voltage is applied to the second selection line coupled to the second selection transistor of the string by applying a fifth voltage to the second doped semiconductor layer coupled to the string, to achieve hole injection into the channel of the string. The way of injecting holes is of the same principle as the way of injecting holes into the channel by applying the first voltage and the second voltage to the string, and the difference is that the direction of hole injection into the channel of the string is different. For example, applying the fifth voltage and the sixth voltage to the string implements injecting holes from the second selection transistor of the string into the channel of the string, and applying the first voltage and the second voltage to the string implements injecting holes from the first selection transistor of the string into the channel of the string.

Figure 9:
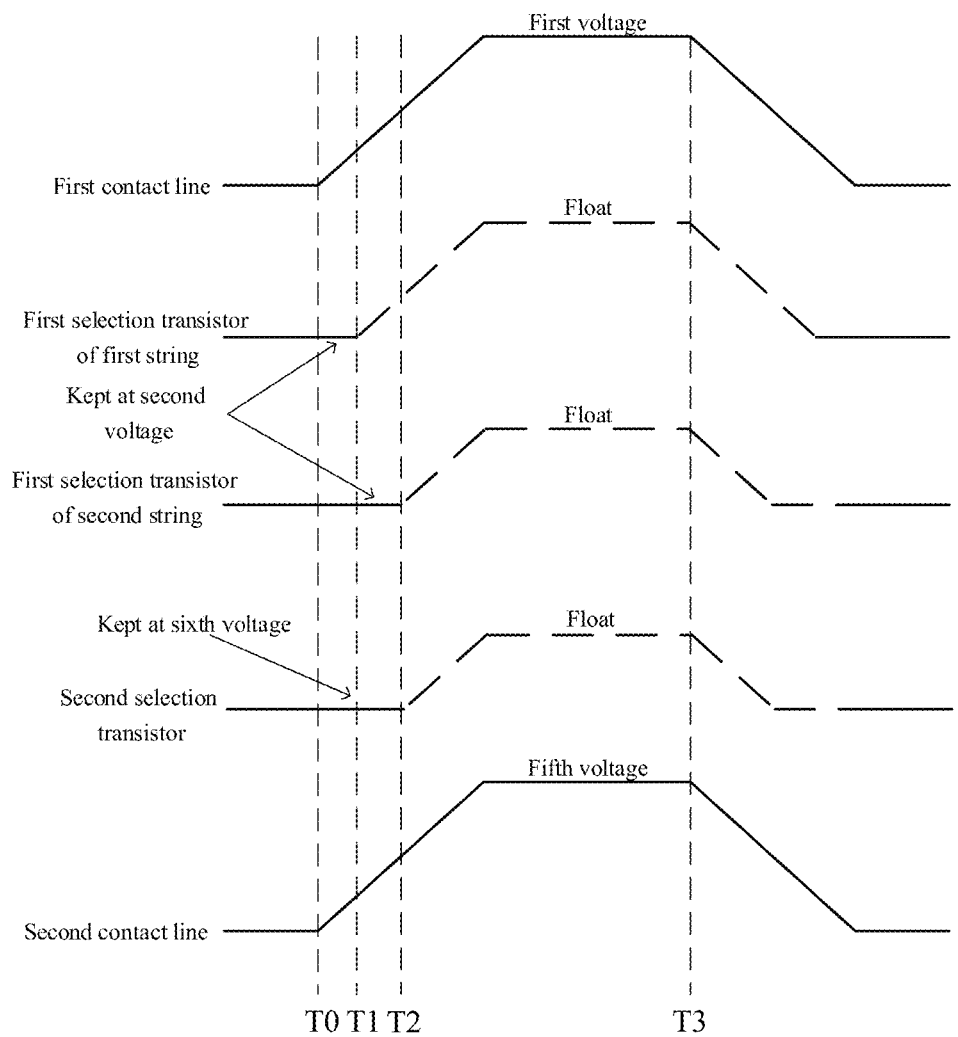
FIG. 9 is a voltage waveform diagram of a block during double-end erasing according to an example implementation.

Referring to FIG. 9, the control process of floating the first selector of the first string in advance during double-end erasing is introduced as follows.

FIG. 9 is a voltage waveform diagram of a block during double-end erasing according to an example implementation. The processes of applying a voltage to the first contact line, the gate of the first selection transistor of the first string and the gate of the second selection transistor of the second string are similar to those in FIG. 7, and will not be repeated herein.

As shown in FIG. 9, starting from the third moment T0, the fifth voltage is applied to the second contact line coupled to the second doped semiconductor layer coupled to each string in the block until the seventh moment T3 when the application of fifth voltage ends, so that the fifth voltage acts on the second doped semiconductor layer. From the third moment T0 to the seventh moment T3, a third voltage (not shown in FIG. 9) is continuously applied to the word lines coupled to various memory cells of each string.

From the third moment T0 to the second moment T2, the sixth voltage is continuously applied to the second selection line coupled to the second selection transistor of each string in the block, so that the gate voltage of the second selection transistor is kept at the sixth voltage. Under the action of the fifth voltage and the sixth voltage, the holes generated by the second doped semiconductor layer coupled to the strings or the holes generated at the position between the second doped semiconductor layer and the second selection transistor move to the channel of the string to raise the potential of the channel. With the increase of the channel potential of each string, when the voltage difference between the channel and the gate of any memory cell is greater than tunneling voltage of the memory cell, the electrons in the memory layer of the memory cell are eliminated.

From the second moment T2, the second selection line coupled to the second selection transistor of each string is floated until the seventh moment T3 when the floating ends. During this period, the gate of the second selection transistor of each string is in a floating state, so that the gate of the second selection transistor of the string is coupled to the corresponding second doped semiconductor layer (that is, the second doped semiconductor layer coupled to the sub-string where the second selection transistor is located) to form a capacitor, and the principle of voltage jump across the capacitor makes the gate voltage of the second selection transistor of each string change with the change of the fifth voltage, so that the voltage difference between the gate of the second selection transistor of each string and the corresponding second doped semiconductor layer is reduced, resulting in the reduction of holes transported to the channel of each string. In this way, the speed of eliminating the electrons in the memory layer of the memory cell of each string from the second moment T2 to the seventh moment T3 is reduced, thereby preventing each string from being over-erased.

In some implementations, in the case of double-end erasing, during the process of erasing multiple strings of the memory block, the first selection transistor of the first storage string and the second selection line coupled with the second selection transistor are floated in advance. The scheme of floating in advance will be introduced as follows.

For ease of description, the time when the second selection transistor of the first string is floated is called the fourth moment, and the time when the second selection transistor of the second string is floated is called the fifth moment. The fourth moment is any time between the third moment and the fifth moment, the fourth moment may be the same as or different from the first moment. The fifth moment is any time between the third moment and the seventh moment, and the fifth moment may be the same as or different from the second moment. Here, the implementations of the present application do not limit the fourth moment and the fifth moment.

As an example, the erase operation performed on the multiple strings of the block includes: at the third moment, applying a fifth voltage to the second doped semiconductor layer coupled to each string in the block; at the first moment, floating the first selection line coupled to the first selection transistor of the first string (as in operation 801 above); at the second moment after the first moment, floating the first selection line coupled to the first selection transistor of the second string (as in operation 802 above); from the third moment to the fourth moment, applying the seventh voltage to the second selection line coupled to the second selection transistor of the first string; at the fourth moment, floating the second selection line coupled to the second selection transistor of the first string; from the third moment to the fifth moment after the fourth moment, applying the seventh voltage to the second selection line coupled to the second selection transistor of the second string; and at the fifth moment, floating the second selection line coupled to the second selection transistor of the second string. Since the first moment is before the second moment and the fourth moment is before the fifth moment, the first selection transistor and the second selection transistor of the first string are floated in advance.

The seventh voltage is less than the fifth voltage. For example, the seventh voltage is greater than or equal to 0 and less than the fifth voltage, and the seventh voltage may be the same as or different from the second voltage. The range of values of the seventh voltage is not limited in the present application.

For any string, the holes are injected into the channels of the strings by applying the fifth voltage to the second doped semiconductor layer coupled to the string, and by applying the seventh voltage to the second selection line coupled to the second selection transistor of the string. The way of injecting holes is of the same principle as the way of injecting holes into the channels by applying the first voltage and the second voltage to the strings, and the difference is that the directions of injecting holes into the channel of the string are different. For example, applying the fifth voltage and the seventh voltage to the string implements hole injection from the second selection transistor of the string into the channel of the string, and applying the first voltage and the second voltage to the string implements hole injection from the first selection transistor of the string to the channel of the string.

The control process of floating the selection transistors at both ends of the first string in advance during the double-end erasing is introduced in conjunction with FIG. 10 as follows.

Figure 10:
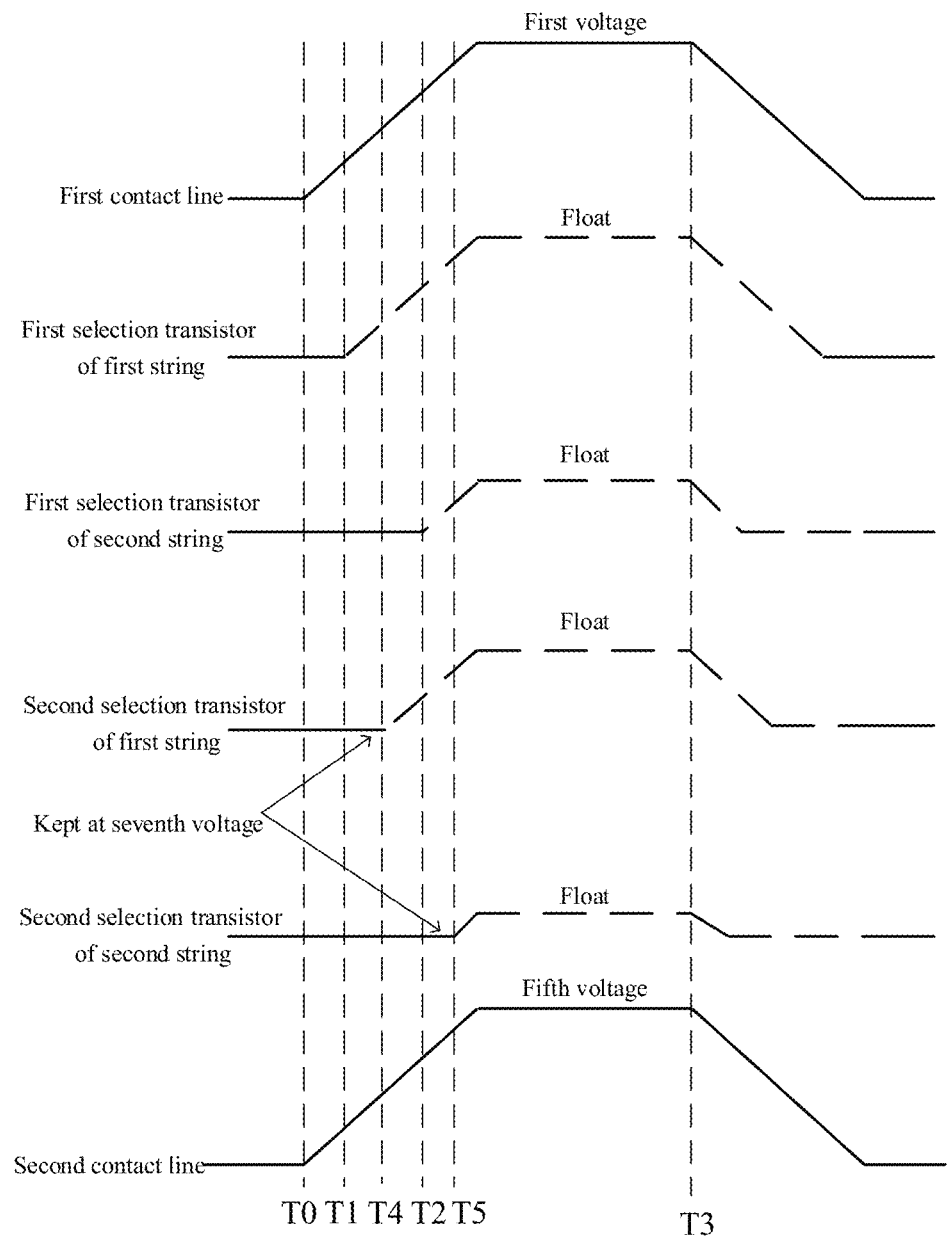
FIG. 10 is a voltage waveform diagram of a block during another double-end erasing according to an example implementation.

FIG. 10 is a voltage waveform diagram of a block during another double-end erasing according to an example implementation. The processes of applying a voltage to the first contact line, the first selection line coupled to the first selection transistor of the first string and the first selection line coupled to the first selection transistor of the second string are similar to those in FIG. 7, and will not be repeated herein.

As shown in FIG. 10, starting from the third moment T0, the fifth voltage is applied to the second contact line coupled to the second doped semiconductor layer coupled to each string in the block until the seventh moment T3 when the application of the fifth voltage ends, so that the fifth voltage acts on the second doped semiconductor layer. From the third moment T0 to the seventh moment T3, the third voltage (not shown in FIG. 10) is continuously applied to the word lines coupled to various memory cells of each string.

From the third moment T0 to the fourth moment T4, the seventh voltage is continuously applied to the second selection line coupled to the second selection transistor of each string in the block, so that the gate voltage of the second selection transistor of each string is kept at the seventh voltage. Under the action of the fifth voltage and the seventh voltage, the holes generated by the second doped semiconductor layer coupled to the string or the holes generated at the position between the second doped semiconductor layer and the second selection transistor move to the channel of the string to raise the potential of the channel. With the increase of the channel potential of each string, when the voltage difference between the channel and the gate of any memory cell is greater than the tunneling voltage of the memory cell, the electrons in the memory layer of the memory cell of the string are eliminated.

From the fourth moment T4, the second selection line coupled to the second selection transistor of the first string is floated until the seventh moment T3 when the floating ends. During this period, the gate of the second selection transistor of the first string is in a floating state, and the gate of the second selection transistor of the first string is coupled to the corresponding second doped semiconductor layer (that is, the second doped semiconductor layer coupled to the substring where the second selection transistor is located) to form a capacitor. The principle of voltage jump across the capacitor makes the gate voltage of the second selection transistor of the first string change with the change of the fifth voltage, so that the voltage difference between the gate of the second selection transistor of the first string and the corresponding second doped semiconductor layer decreases, resulting in the reduction of holes transported to the channels of the first string. Thus, the speed of eliminating the electrons in the memory layer of the memory cells of the first string from the fourth moment T4 to the seventh moment T3 is reduced, thereby preventing the first string from being over-erased.

From the fourth moment T4 to the fifth moment T5, the seventh voltage is continuously applied to the second selection line coupled to the second selection transistor of the second string, so that the gate voltage of the second selection transistor of the second string is kept at the seven voltages. Under the action of the fifth voltage and the seventh voltage, the holes generated by the second doped semiconductor layer coupled to the second string or the holes generated at the position between the second doped semiconductor layer and the second selection transistor move to the channel of the second string to raise the potential of the channel. When the voltage difference between the channel and the gate of any memory cell of the second string is greater than the tunneling voltage of the memory cell, the electrons in the memory layer of the memory cell of the string are eliminated. From the fifth moment, the second selection line coupled to the second selection transistor of the second string is floated. During this period, the gate of the second selection transistor of the second string is in a floating state, so that the gate of the second selection transistor of the second string is coupled to the corresponding second doped semiconductor layer (that is, the second doped semiconductor layer coupled to the substring where the second selection transistor is located) to form a capacitor. The principle of voltage jump across the capacitor makes the gate voltage of the second selection transistor of the second string change with the change of the fifth voltage, so that the voltage difference between the gate of the second selection transistor of the second string and the corresponding second doped semiconductor layer decreases, resulting in reduction of the holes transported to the channel of the second string. Thus, the speed of eliminating the electrons in the memory layer of the memory cell of the second string from the fifth moment T5 to the seventh moment T3 is reduced, thereby preventing the second string from being over-erased.

For the above-mentioned erase operation performed on multiple strings in the block, the erase operation ends at the seventh moment. Assuming that at the sixth moment after the seventh moment, the voltages of various control lines (such as BL, SL, DSL, SSL and BL) of the peripheral circuit coupled to the block have all restored into their respective initial voltages, and the single erasing process of the block ends. At the sixth moment, the erase verification operation is performed on each string in the block, to verify that there are still not erased strings in the block. For example, if it is verified that there is a memory cell that has not been successfully erased in any string, the string is a string that has not been erased. At this time, the verification of the string fails, and the string is the second string. If it is verified that various memory cells of any string are all successfully erased (that is, there is no memory cell that has not been successfully erased), the string is a string that has been erased. At this time, the verification of the string passes, and the string is the first string.

In the case where there is a second string that has failed the erase verification in the block, it means that the erasing of the second string has not completed after the above-mentioned erasing process of block, and then the erase operation is performed on multiple strings in the block again. At the first moment, the first selection line coupled to the first selection transistor of the first string is floated, and at the second moment, the first selection line coupled to the first selection transistor of the second string is floated.

Figure 11:
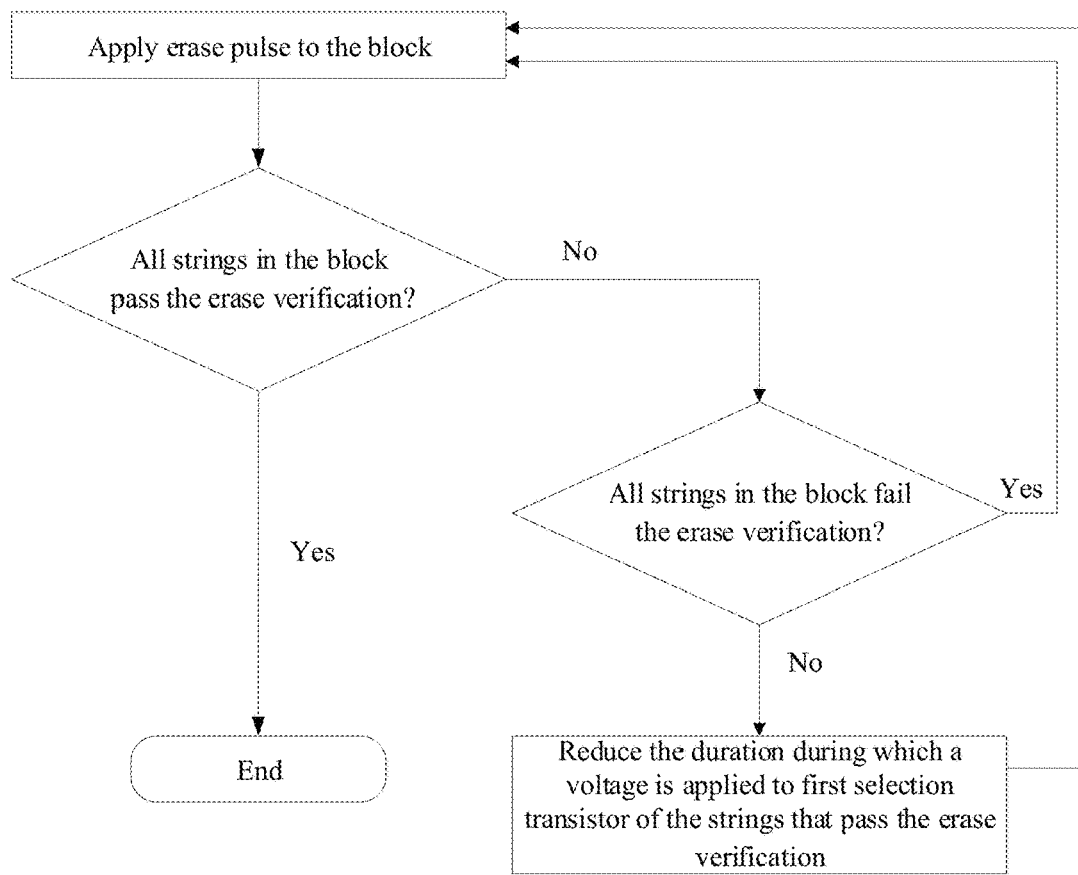
FIG. 11 is a flow chart showing a method for block erase operation of a memory according to an example implementation.

For example, FIG. 11 shows a flowchart of a method for a block erase operation of a memory according to an example implementation. An erase pulse (such as a first voltage) is applied to a block in the memory to perform erase operation on the block once. Then, erase verification operation is performed on each string in the block to determine whether all strings in the block have passed the erase verification. If yes, it means that all strings in the block have been erased, then the next erase verification operation is no longer performed on the block. If not, it is necessary to further determine whether all the strings in the block have failed the erase verification. If all the strings in the block have failed the erase verification, the erase pulse is applied to the block again to perform the next erase operation on the block. During this period, the first selection transistors of various strings of the block are simultaneously floated. If not all the strings in the block fail the erase verification, it means that a portion of the strings in the block have failed the erase verification, and another portion of the strings have passed the erase verification. In this case, the erase pulse is applied to the block again to perform the next erase operation on the block. During this period, the duration during which the voltage is applied to the first selection transistors of the strings that have passed the erase verification is reduced, so as to float the first selection transistors of the strings that have passed the erase verification in advance, and then float the first selection transistors of the strings that have failed the erase verification. The strings that pass the erase verification are the first strings, and the strings that fail the erase verification are the second strings. After performing multiple erase operations on the block, all the strings of the block pass erase verification.

It should be understood that if a portion of the strings in the block has failed the erase verification, and another portion of the strings has passed the erase verification, the duration during which the voltage is applied to the first selection transistor of the strings that have passed the erase verification can be reduced once without being reduced for multiple times during applying of the erase pulse to the block again. For example, the duration from the third moment to the second moment is reduced into the duration from the third moment to the first moment. In the case where the first string and the second string are simultaneously stored in the block, the first selection transistor of the first string may be floated at the first moment every time the block is erased.

The memory 100 described above may be applied in a memory system to provide data storage services for hosts in the memory system. Next, the architecture of the memory system is introduced as follows.

Figure 12:
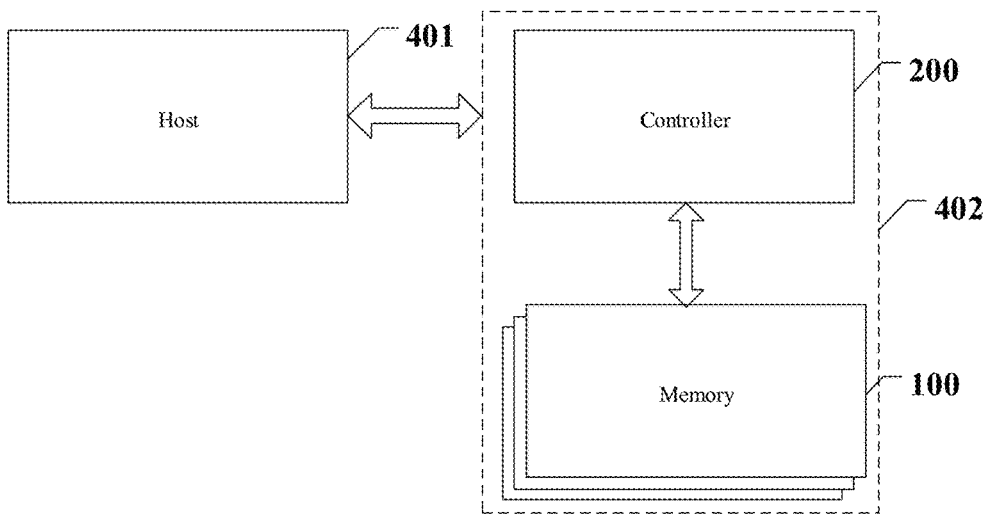
FIG. 12 is a schematic diagram of a memory system according to an example implementation.

FIG. 12 is a schematic diagram of a memory system according to an example implementation. As shown in FIG. 12, the memory system 400 may be a mobile phone, desktop computer, laptop computer, tablet computer, vehicle computer, game console, printer, pointing device, wearable electronic device, smart sensor, virtual reality (VR) device, augmented reality (AR) device or any other suitable electronic devices having storage therein.

As shown in FIG. 12, the memory system 400 includes a host 401 and a memory subsystem 402. The host 401 may be a processor (for example, a central processing unit (CPU)) or a system on chip (SoC) (for example, an application processor (AP)) of the electronic device. Host 401 may be configured to send data to memory 100 in memory subsystem 402. Alternatively, host 401 may be configured to receive data from memory 100.

The memory subsystem 402 includes one or more memory 100 and a controller 200. The memory 100 is coupled to the controller 200. Memory 100 may be any memory disclosed in this application. Optionally, the memory 100 is an NAND flash memory device, such as three-dimensional (3D) NAND flash memory devices.

According to some implementations, the controller 200 is further coupled to a host 401. The controller 200 may manage data stored in the memory 100 and communicate with the host 401.

In one possible implementation, the controller 200 is designed to operate in low duty-cycle environments such as Secure Digital (SD) cards, Compact Flash (CF) cards, Universal Serial Bus (USB) flash drives, or other media for use in electronic devices such as personal computers, digital cameras, mobile phones, and the like.

In one possible implementation, the controller 200 is designed to operate in a high duty-cycle environment solid-state drive (SSD) or embedded multimedia card (eMMC). SSD or eMMC are used as data storage for mobile devices such as a smartphone, tablet computer, laptop computer, etc., and enterprise memory arrays.

The controller 200 may be configured to control operations of the memory 100, such as read, erase and program operations. The controller 200 may be further configured to manage various functions related to data stored or to be stored in the memory 100, including but not limited to bad block management, garbage collection, logical-to-physical address translation, wear leveling, and the like. In one possible implementation, controller 200 is further configured to process error correction code (ECC) on data read from or written to memory 100.

The controller 200 may also perform any other suitable functions, such as formatting the memory 100. The controller 200 may communicate with external device(s) (e.g., host 401) according to a particular communication protocol. For example, the controller 200 can communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The controller 200 and the one or more memories 100 may be integrated into various types of storage devices, e.g., be included in the same package (e.g., a Universal Flash Storage (UFS) package or an eMMC package). That is, the memory system 400 can be implemented and packaged into different types of terminal electronic products.

Figure 13:
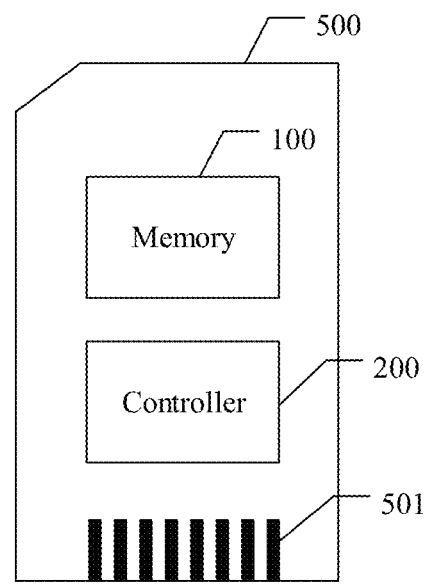
FIG. 13 is a schematic diagram of a memory card according to an example implementation.

FIG. 13 is a schematic diagram of a memory card according to an example implementation. As shown in FIG. 13, a controller 200 and a single memory 100 may be integrated into a memory card 500. The memory card 500 may include a PC card (PCMCIA, Personal Computer Memory Card International Association), CF card, Smart Media (SM) card, memory stick, multimedia card (MMC, RS-MMC, MMC-micro), SD card (SD, miniSD, microSD, SDHC), UFS, etc. The memory card 500 may further include a memory card connector 501 that couples the memory card 500 to a host (e.g., host 401 in FIG. 12).

Figure 14:
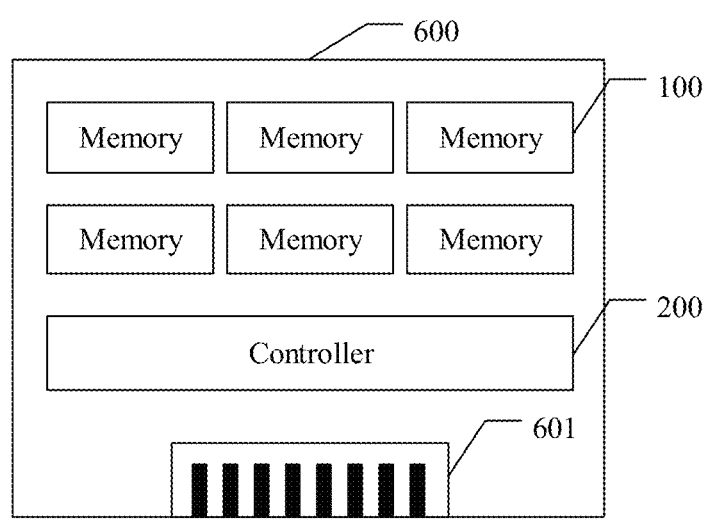
FIG. 14 is a schematic diagram of a solid-state drive according to an example implementation.

FIG. 14 is a schematic diagram of a solid-state drive according to an example implementation. As shown in FIG. 14, a controller 200 and multiple memories 100 may be integrated into a solid-state drive (SSD) 600. Solid-state drive 600 may further include a solid state drive connector 601 that couples solid-state drive 600 to a host (e.g., host 401 in FIG. 12). In one possible implementation, the storage capacity and/or operating speed of the solid-state drive 600 are greater than the storage capacity and/or operating speed of the memory card 500.

Implementations of the present application provide a memory, a memory system, and a method of operating the memory, which can reduce the lateral spreading of the string and weaken the threshold voltage drift of the memory cells in the string. The technical solution is as follows.

In a first aspect, a memory is provided, the memory includes a memory array and a peripheral circuit, the memory array comprising a block and a first selection line, the block comprising a plurality of strings, each of the strings comprising a first selection transistor, the first selection line being coupled to the first selection transistor, the peripheral circuit being coupled to the first selection line; the peripheral circuit is configured to perform an erase operation on the plurality of strings in the block; to perform the erase operation, the peripheral circuit is configured to:

at a first moment, float the first selection line coupled to the first selection transistor of a first string, the first string being the string that has been erased among the plurality of strings; and at a second moment after the first moment, float the first selection line coupled to the first selection transistor of a second string, the second string being the string that has not been erased among the plurality of strings.

In a possible implementation, the memory array further comprises a first doped semiconductor layer and a plurality of word lines, the first doped semiconductor layer is coupled to one end of each string close to the first selection transistor, each string further includes a plurality of memory cells, the plurality of word lines are respectively coupled to the plurality of memory cells of each string, and the peripheral circuit is further coupled to the plurality of word lines;

the peripheral circuit is further configured to:
at a third moment before the first moment, apply a first voltage to the first doped semiconductor layer coupled to each string in the block;
from the third moment to the first moment, apply a second voltage to the first selection line coupled to the first selection transistor of the first string, the second voltage being less than the first voltage;
from the third moment to the second moment, apply the second voltage to the first selection line coupled to the first selection transistor of the second string; and
at the third moment, apply a third voltage to the word line coupled to various memory cells of each string in the block, the third voltage being less than the first voltage.

In a possible implementation, each string in the block further comprises a second selection transistor, and the memory array further comprises a second doped semiconductor layer and a second selection line, the second doped semiconductor layer is coupled to one end of each string close to the second selection transistor, the second selection line is coupled to the second selection transistor, and the peripheral circuit is further coupled to the second selection line;
the peripheral circuit is further configured to:
at the third moment, apply a fourth voltage to the second doped semiconductor layer coupled to each string in the block; and
at the third moment, float the second selection line coupled to the second selection transistor of each string in the block.

In a possible implementation, the first doped semiconductor layer is coupled to a bit line, and the first doped semiconductor layer is an N-type doped semiconductor layer.

In a possible implementation, the first doped semiconductor layer is coupled to a source line, and the first doped semiconductor layer is an N-type doped semiconductor layer or a P-type doped semiconductor layer.

In a possible implementation, each string in the block further comprises a second selection transistor, the memory array further comprises a second doped semiconductor layer and a second selection line, the second doped semiconductor layer is coupled to one end of each string close to the second selection transistor, the second selection line is coupled to the second selection transistor, and the peripheral circuit is further coupled to the second selection line;
the peripheral circuit is further configured to:
at the third moment, apply a fifth voltage to the second doped semiconductor layer coupled to each string in the block.

In a possible implementation, the peripheral circuit is further configured to:
from the third moment to the second moment, apply a sixth voltage to the second selection line coupled to the second selection transistor of each string in the block, the sixth voltage being less than the fifth voltage; and
at the second moment, float the second selection line coupled to the second selection transistor of each string in the block.

In a possible implementation, the peripheral circuit is further configured to:
from the third moment to a fourth moment, apply a seventh voltage to the second selection line coupled to the second selection transistor of the first string, and at the fourth moment, float the second selection line coupled to the second selection transistor of the first string, the seventh voltage being less than the fifth voltage; and
from the third moment to a fifth moment after the fourth moment, apply the seventh voltage to the second selection line coupled to the second selection transistor of the second string, and at the fifth moment, float the second selection line coupled to the second selection transistor of the second string.

In a possible implementation, the first doped semiconductor layer is coupled to a bit line, the first doped semiconductor layer being an N-type doped semiconductor layer; and;
the second doped semiconductor layer is coupled to a source line, the second doped semiconductor layer being an N-type doped semiconductor layer or a P-type doped semiconductor layer.

In a possible implementation, the first doped semiconductor layer is coupled to a source line, the first doped semiconductor layer being an N-type doped semiconductor layer or a P-type doped semiconductor layer; and
the second doped semiconductor layer is coupled to a bit line, the second doped semiconductor layer being an N-type doped semiconductor layer.

In a possible implementation, the string includes a plurality of substrings, each substring includes a first selection transistor and a plurality of memory cells, various first selection transistors in the same string is coupled to the same first selection line, and the first selection transistors in different strings are coupled to different first selection lines.

In a possible implementation, the peripheral circuit is further configured to:
at a sixth moment after the second moment, perform an erase verification operation on each string in the block; and
in a case where there is a second string that fails an erase verification in the block, perform the operation of performing the erase operation on the plurality of strings in the block.

In a second aspect, a memory system is provided, the memory system includes a memory configured to store data and a controller coupled to the memory and configured to control the memory, wherein the memory comprises a memory array and a peripheral circuit, the memory array comprises a block and a first selection line, the block comprises a plurality of strings, each of the strings comprises a first selection transistor, the first selection line is coupled to the first selection transistor, and the peripheral circuit is coupled to the first selection line; the peripheral circuit is configured to perform an erase operation on the plurality of strings in the block; to perform the erase operation, the peripheral circuit is configured to:
at a first moment, float the first selection line coupled to the first selection transistor of a first string, the first string being the string that has been erased among the plurality of strings; and
at a second moment after the first moment, float the first selection line coupled to the first selection transistor of a second string, the second string being the string that has not been erased among the plurality of strings.

In a possible implementation, the memory array further comprises a first doped semiconductor layer and a plurality of word lines, the first doped semiconductor layer is coupled to one end of each string close to the first selection transistor, each string further includes a plurality of memory cells, the plurality of word lines are respectively coupled to the plurality of memory cells of each string, and the peripheral circuit is further coupled to the plurality of word lines;

the peripheral circuit is further configured to:
at a third moment before the first moment, apply a first voltage to the first doped semiconductor layer coupled to each string in the block;
from the third moment to the first moment, apply a second voltage to the first selection line coupled to the first selection transistor of the first string, the second voltage being less than the first voltage;
from the third moment to the second moment, apply the second voltage to the first selection line coupled to the first selection transistor of the second string; and
at the third moment, apply a third voltage to the word line coupled to various memory cells of each string in the block, the third voltage being less than the first voltage.

In a possible implementation, each string in the block further comprises a second selection transistor, and the memory array further comprises a second doped semiconductor layer and a second selection line, the second doped semiconductor layer is coupled to one end of each string close to the second selection transistor, the second selection line is coupled to the second selection transistor, and the peripheral circuit is further coupled to the second selection line;

the peripheral circuit is further configured to:
at the third moment, apply a fourth voltage to the second doped semiconductor layer coupled to each string in the block; and
at the third moment, float the second selection line coupled to the second selection transistor of each string in the block.

In a possible implementation, the first doped semiconductor layer is coupled to a bit line, and the first doped semiconductor layer is an N-type doped semiconductor layer.

In a possible implementation, the first doped semiconductor layer is coupled to a source line, and the first doped semiconductor layer is an N-type doped semiconductor layer or a P-type doped semiconductor layer.

In a possible implementation, each string in the block further comprises a second selection transistor, the memory array further comprises a second doped semiconductor layer and a second selection line, the second doped semiconductor layer is coupled to one end of each string close to the second selection transistor, the second selection line is coupled to the second selection transistor, and the peripheral circuit is further coupled to the second selection line;

the peripheral circuit is further configured to:
at the third moment, apply a fifth voltage to the second doped semiconductor layer coupled to each string in the block.

In a possible implementation, the peripheral circuit is further configured to:
from the third moment to the second moment, apply a sixth voltage to the second selection line coupled to the second selection transistor of each string in the block, the sixth voltage being less than the fifth voltage; and
at the second moment, float the second selection line coupled to the second selection transistor of each string in the block.

In a possible implementation, the peripheral circuit is further configured to:
from the third moment to a fourth moment, apply a seventh voltage to the second selection line coupled to the second selection transistor of the first string, and at the fourth moment, float the second selection line coupled to the second selection transistor of the first string, the seventh voltage being less than the fifth voltage; and
from the third moment to a fifth moment after the fourth moment, apply the seventh voltage to the second selection line coupled to the second selection transistor of the second string, and at the fifth moment, float the second selection line coupled to the second selection transistor of the second string.

In a possible implementation, the first doped semiconductor layer is coupled to a bit line, the first doped semiconductor layer being an N-type doped semiconductor layer; and
the second doped semiconductor layer is coupled to a source line, the second doped semiconductor layer being an N-type doped semiconductor layer or a P-type doped semiconductor layer.

In a possible implementation, the first doped semiconductor layer is coupled to a source line, the first doped semiconductor layer being an N-type doped semiconductor layer or a P-type doped semiconductor layer; and
the second doped semiconductor layer is coupled to a bit line, the second doped semiconductor layer being an N-type doped semiconductor layer.

In a possible implementation, the string includes a plurality of substrings, each substring includes a first selection transistor and a plurality of memory cells, various first selection transistors in the same string is coupled to the same first selection line, and the first selection transistors in different strings are coupled to different first selection lines.

In a possible implementation, the peripheral circuit is further configured to:
at a sixth moment after the second moment, perform an erase verification operation on each string in the block; and
in a case where there is a second string that fails an erase verification in the block, perform the operation of performing the erase operation on the plurality of strings in the block.

In a possible implementation, the memory system further includes a host; the host is coupled to the controller, and the host is configured to: transmit data to the memory or receive data from the memory by the controller.

In a third aspect, a method of operating a memory is provided, the memory includes a memory array and a peripheral circuit, the memory array includes a block and a first selection line, the block includes a plurality of strings, and each string including a first selection transistor, the first selection line is coupled to the first selection transistor, and the peripheral circuit is coupled to the first selection line; the method includes performing an erase operation on the plurality of strings in the block, and the erase operation comprises:
at a first moment, floating the first selection line coupled to the first selection transistor of a first string, the first string being the string that has been erased among the plurality of strings; and
at a second moment after the first moment, floating the first selection line coupled to the first selection transistor of a second string, the second string being the string that has not been erased among the plurality of strings.

In a possible implementation, the memory array further comprises a first doped semiconductor layer and a plurality of word lines, the first doped semiconductor layer is coupled to one end of each string close to the first selection transistor, each string further includes a plurality of memory cells, the plurality of word lines are respectively coupled to the plurality of memory cells of each string;

the erase operation further comprises:

at a third moment before the first moment, applying a first voltage to the first doped semiconductor layer coupled to each string in the block;

from the third moment to the first moment, applying a second voltage to the first selection line coupled to the first selection transistor of the first string, the second voltage being less than the first voltage;

from the third moment to the second moment, applying the second voltage to the first selection line coupled to the first selection transistor of the second string; and at the third moment, applying a third voltage to the word line coupled to various memory cells of each string in the block, the third voltage being less than the first voltage.

In a possible implementation, each string in the block further comprises a second selection transistor, and the memory array further comprises a second doped semiconductor layer and a second selection line, the second doped semiconductor layer is coupled to one end of each string close to the second selection transistor, the second selection line is coupled to the second selection transistor;

the erase operation further comprises:

at the third moment, applying a fourth voltage to the second doped semiconductor layer coupled to each string in the block; and at the third moment, floating the second selection line coupled to the second selection transistor of each string in the block.

In a possible implementation, the first doped semiconductor layer is coupled to a bit line, and the first doped semiconductor layer is an N-type doped semiconductor layer.

In a possible implementation, the first doped semiconductor layer is coupled to a source line, and the first doped semiconductor layer is an N-type doped semiconductor layer or a P-type doped semiconductor layer.

In a possible implementation, each string in the block further comprises a second selection transistor, the memory array further comprises a second doped semiconductor layer and a second selection line, the second doped semiconductor layer is coupled to one end of each string close to the second selection transistor, the second selection line is coupled to the second selection transistor;

the erase operation further includes:

at the third moment, applying a fifth voltage to the second doped semiconductor layer coupled to each string in the block.

In a possible implementation, the erase operation further includes:

from the third moment to the second moment, applying a sixth voltage to the second selection line coupled to the second selection transistor of each string in the block, the sixth voltage being less than the fifth voltage; and at the second moment, floating the second selection line coupled to the second selection transistor of each string in the block.

In a possible implementation, the erase operation further includes:

from the third moment to a fourth moment, applying a seventh voltage to the second selection line coupled to the second selection transistor of the first string, and at the fourth moment, floating the second selection line coupled to the second selection transistor of the first string, the seventh voltage being less than the fifth voltage; and from the third moment to a fifth moment after the fourth moment, applying the seventh voltage to the second selection line coupled to the second selection transistor of the second string, and at the fifth moment, floating the second selection line coupled to the second selection transistor of the second string.

In a possible implementation, the first doped semiconductor layer is coupled to a bit line, the first doped semiconductor layer being an N-type doped semiconductor layer; and;

the second doped semiconductor layer is coupled to a source line, the second doped semiconductor layer being an N-type doped semiconductor layer or a P-type doped semiconductor layer.

In a possible implementation, the first doped semiconductor layer is coupled to a source line, the first doped semiconductor layer being an N-type doped semiconductor layer or a P-type doped semiconductor layer; and the second doped semiconductor layer is coupled to a bit line, the second doped semiconductor layer being an N-type doped semiconductor layer.

In a possible implementation, the string includes a plurality of substrings, each substring includes a first selection transistor and a plurality of memory cells, various first selection transistors in the same string is coupled to the same first selection line, and the first selection transistors in different strings are coupled to different first selection lines.

In a possible implementation, after floating the first selection line coupled to the first selection transistor of the second string, the method further comprises:

at a sixth moment after the second moment, performing an erase verification operation on each string in the block; and in a case where there is a second string that fails an erase verification in the block, performing the operation of performing the erase operation on the plurality of strings in the block.

In accordance with the technical solution provided by the implementations of the present application, when an erase operation is performed on various strings in the block, if there are a first string that has been erased and a second string that has not been erased among the strings, the selection line coupled to the first selection transistor of the first string is floated in advance before the selection line coupled to the first selection transistor of the second string is floated, to reduce the erasing speed of the first string and prevent the first string from being over-erased during the erasing of the second string, which reduces the possibility of lateral spreading of memory cells in the subsequent first string after programming, and weakens the threshold voltage drift of the memory cells in the first string.

The above descriptions are only optional implementations of the application, and are not intended to limit the application. Any modifications, equivalent replacements, improvements and the like made within the spirit and principles of the application shall be encompassed within the protection scope of the application.

What is claimed is:

1. A memory, comprising:
a memory array, the memory array comprising a block and a first selection line, the block comprising a plurality of strings, each string comprising a first selection transistor, the first selection line being coupled to the first selection transistor; and a peripheral circuit, the peripheral circuit being coupled to the first selection line, and being configured to perform an erase operation on the plurality of strings in the block; wherein to perform the erase operation, the peripheral circuit is configured to:
at a first moment, float a first selection line coupled to a first selection transistor of a first string, the first string being a string that has been erased among the plurality of strings; and
at a second moment after the first moment, float a first selection line coupled to a first selection transistor of a second string, the second string being a string that has not been erased among the plurality of strings.

2. The memory according to claim 1, wherein the memory array further comprises:
a first doped semiconductor layer, the first doped semiconductor layer being coupled to one end of each string close to the first selection transistor, each string further comprising a plurality of memory cells; and
a plurality of word lines, the plurality of word lines being respectively coupled to the plurality of memory cells of each string, and the peripheral circuit being further coupled to the plurality of word lines;
wherein the peripheral circuit is further configured to:
at a third moment before the first moment, apply a first voltage to a first doped semiconductor layer coupled to each string in the block;
from the third moment to the first moment, apply a second voltage to a first selection line coupled to a first selection transistor of the first string, the second voltage being less than the first voltage;
from the third moment to the second moment, apply the second voltage to a first selection line coupled to a first selection transistor of the second string; and
at the third moment, apply a third voltage to a word line coupled to various memory cells of each string in the block, the third voltage being less than the first voltage.

3. The memory according to claim 2, wherein each string in the block further comprises a second selection transistor, and the memory array further comprises:
a second doped semiconductor layer, the second doped semiconductor layer being coupled to one end of each string close to the second selection transistor; and
a second selection line, the second selection line being coupled to the second selection transistor, and the peripheral circuit being further coupled to the second selection line;
wherein the peripheral circuit is further configured to:
at the third moment, apply a fourth voltage to a second doped semiconductor layer coupled to each string in the block; and
at the third moment, float a second selection line coupled to a second selection transistor of each string in the block.

4. The memory according to claim 3, wherein the first doped semiconductor layer is coupled to a bit line, and the first doped semiconductor layer is an N-type doped semiconductor layer.

5. The memory according to claim 3, wherein the first doped semiconductor layer is coupled to a source line, and the first doped semiconductor layer is an N-type doped semiconductor layer or a P-type doped semiconductor layer.

6. The memory according to claim 2, wherein each string in the block further comprises a second selection transistor, the memory array further comprises:

a second doped semiconductor layer, the second doped semiconductor layer being coupled to one end of each string close to the second selection transistor; and
a second selection line, the second selection line being coupled to the second selection transistor, and the peripheral circuit being further coupled to the second selection line;
wherein the peripheral circuit is further configured to:
at the third moment, apply a fifth voltage to a second doped semiconductor layer coupled to each string in the block.

7. The memory according to claim 6, wherein the peripheral circuit is further configured to:
from the third moment to the second moment, apply a sixth voltage to a second selection line coupled to a second selection transistor of each string in the block, the sixth voltage being less than the fifth voltage; and
at the second moment, float a second selection line coupled to a second selection transistor of each string in the block.

8. The memory according to claim 6, wherein the peripheral circuit is further configured to:
from the third moment to a fourth moment, apply a seventh voltage to a second selection line coupled to a second selection transistor of the first string, and at the fourth moment, float a second selection line coupled to a second selection transistor of the first string, the seventh voltage being less than the fifth voltage; and
from the third moment to a fifth moment after the fourth moment, apply the seventh voltage to a second selection line coupled to a second selection transistor of the second string, and at the fifth moment, float a second selection line coupled to a second selection transistor of the second string.

9. The memory of claim 6, wherein,
the first doped semiconductor layer is coupled to a bit line, the first doped semiconductor layer being an N-type doped semiconductor layer; and
the second doped semiconductor layer is coupled to a source line, the second doped semiconductor layer being an N-type doped semiconductor layer or a P-type doped semiconductor layer.

10. The memory of claim 6, wherein,
the first doped semiconductor layer is coupled to a source line, the first doped semiconductor layer being an N-type doped semiconductor layer or a P-type doped semiconductor layer; and
the second doped semiconductor layer is coupled to a bit line, the second doped semiconductor layer being an N-type doped semiconductor layer.

11. The memory of claim 1, wherein the strings comprises a plurality of substrings, each substring comprises a first selection transistor and a plurality of memory cells, various first selection transistors in the same string are coupled to the same first selection line, and first selection transistors in different strings are coupled to different first selection lines.

12. A memory system, comprising:
a memory configured to store data, the memory comprising:
a memory array, the memory array comprising a block and a first selection line,
the block comprising a plurality of strings, each string comprising a first selection transistor, the first selection line being coupled to the first selection transistor; and a peripheral circuit, the peripheral circuit being coupled to the first selection line and being configured to perform an erase operation on the plurality of strings in the block, and a controller coupled to the memory and configured to control the memory, wherein to perform the erase operation, the peripheral circuit is configured to:

at a first moment, float a first selection line coupled to a first selection transistor of a first string, the first string being a string that has been erased among the plurality of strings; and at a second moment after the first moment, float a first selection line coupled to a first selection transistor of a second string, the second string being a string that has not been erased among the plurality of strings.

13. The memory system according to claim 12, wherein the memory system further comprises a host coupled to the controller and configured to:

transmit data to the memory or receive data from the memory by the controller.

14. A method of operating a memory, wherein the memory comprises a memory array, the memory array comprises a block and a first selection line, the block comprises a plurality of strings, and each string comprises a first selection transistor;

wherein the method comprises performing an erase operation on the plurality of strings in the block, and the erase operation comprises:

at a first moment, floating a first selection line coupled to a first selection transistor of a first string, the first string being a string that has been erased among the plurality of strings; and at a second moment after the first moment, floating a first selection line coupled to a first selection transistor of a second string, the second string being a string that has not been erased among the plurality of strings.

15. The method according to claim 14, wherein the memory array further comprises:

a first doped semiconductor layer, the first doped semiconductor layer being coupled to one end of each string close to the first selection transistor, each string further comprising a plurality of memory cells; and a plurality of word lines, the plurality of word lines being respectively coupled to the plurality of memory cells of each string;

wherein the erase operation further comprises:

at a third moment before the first moment, applying a first voltage to a first doped semiconductor layer coupled to each string in the block;

from the third moment to the first moment, applying a second voltage to a first selection line coupled to a first selection transistor of the first string, the second voltage being less than the first voltage;

from the third moment to the second moment, applying the second voltage to a first selection line coupled to a first selection transistor of the second string; and at the third moment, applying a third voltage to a word line coupled to various memory cells of each string in the block, the third voltage being less than the first voltage.

16. The method according to claim 15, wherein each string in the block further comprises a second selection transistor, the memory array further comprises:

a second doped semiconductor layer, the second doped semiconductor layer being coupled to one end of each string close to the second selection transistor; and a second selection line, the second selection line being coupled to the second selection transistor;

wherein the erase operation further comprises:

at the third moment, applying a fourth voltage to a second doped semiconductor layer coupled to each string in the block; and at the third moment, floating a second selection line coupled to a second selection transistor of each string in the block.

17. The method according to claim 15, wherein each string in the block further comprises a second selection transistor, the memory array further comprises:

a second doped semiconductor layer, the second doped semiconductor layer being coupled to one end of each string close to the second selection transistor; and a second selection line, the second selection line being coupled to the second selection transistor;

wherein the erase operation further comprises:

at the third moment, applying a fifth voltage to a second doped semiconductor layer coupled to each string in the block.

18. The method according to claim 17, wherein the erase operation further comprises:

from the third moment to the second moment, applying a sixth voltage to a second selection line coupled to a second selection transistor of each string in the block, the sixth voltage being less than the fifth voltage; and at the second moment, floating a second selection line coupled to a second selection transistor of each string in the block.

19. The method according to claim 17, wherein the erase operation further comprises:

from the third moment to a fourth moment, applying a seventh voltage to a second selection line coupled to a second selection transistor of the first string, and at the fourth moment, floating a second selection line coupled to a second selection transistor of the first string, the seventh voltage being less than the fifth voltage; and from the third moment to a fifth moment after the fourth moment, applying the seventh voltage to a second selection line coupled to a second selection transistor of the second string, and at the fifth moment, floating a second selection line coupled to a second selection transistor of the second string.

20. The method according to claim 14, wherein after floating a first selection line coupled to a first selection transistor of the second string, the method further comprises:

at a sixth moment after the second moment, performing an erase verification operation on each string in the block; and in a case where there is a second string that fails an erase verification in the block, performing the erase operation on the plurality of strings in the block.

* * * * *